United States Patent
Ueno et al.

(10) Patent No.: US 9,637,108 B2
(45) Date of Patent: May 2, 2017

(54) VEHICLE DRIVING-TORQUE CONTROL DEVICE

(71) Applicant: NISSAN MOTOR CO., LTD., Yokohama-shi, Kanagawa (JP)

(72) Inventors: Munetoshi Ueno, Atsugi (JP); Jun Amemiya, Atsugi (JP); Noboru Kudo, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 1 day.

(21) Appl. No.: 14/650,752

(22) PCT Filed: Nov. 26, 2013

(86) PCT No.: PCT/JP2013/081703
§ 371 (c)(1),
(2) Date: Jun. 9, 2015

(87) PCT Pub. No.: WO2014/091917
PCT Pub. Date: Jun. 19, 2014

(65) Prior Publication Data
US 2016/0185336 A1      Jun. 30, 2016

(30) Foreign Application Priority Data

Dec. 12, 2012   (JP) .................................. 2012-271244

(51) Int. Cl.
*B60L 15/20*      (2006.01)
*B60W 20/10*     (2016.01)
(Continued)

(52) U.S. Cl.
CPC ............... *B60W 20/10* (2013.01); *B60K 6/48* (2013.01); *B60K 6/547* (2013.01); *B60L 7/14* (2013.01);
(Continued)

(58) Field of Classification Search
CPC   B60K 23/08; B60K 6/44; B60K 6/52; B60W 10/02; B60W 10/10;
(Continued)

(56) References Cited

U.S. PATENT DOCUMENTS

| 7,179,195 B2 * | 2/2007 | Joe ......................... B60K 6/445 477/5 |
| 2005/0159861 A1 * | 7/2005 | Iwatsuki ............... B60W 10/08 701/22 |

FOREIGN PATENT DOCUMENTS

| JP | 2009-047080 A | 3/2009 |
| JP | 2012-091618 A | 5/2012 |

(Continued)

*Primary Examiner* — Dalena Tran
(74) *Attorney, Agent, or Firm* — Foley & Lardner LLP

(57) ABSTRACT

A vehicular driving torque control apparatus, comprising: a limitation variation rate setting section included in a driving torque control section and configured to set, in a form of a limitation variation rate, a low torque side limitation variation rate used in a low torque side until the target driving torque reaches to a torque variation rate switching threshold value and a high torque side limitation variation rate used in a high torque side exceeding the torque variation rate switching threshold value and to execute a limitation suppression variation rate setting process in which the low torque side limitation variation rate is set to be larger than the high torque side limitation variation rate until the target driving torque reaches to the torque variation rate switching threshold value.

9 Claims, 23 Drawing Sheets

(51) Int. Cl.
  *B60K 6/48* (2007.10)
  *B60K 6/547* (2007.10)
  *B60W 10/06* (2006.01)
  *B60W 10/08* (2006.01)
  *B60W 20/00* (2016.01)
  *F02N 11/08* (2006.01)
  *B60L 7/14* (2006.01)
  *B60L 11/14* (2006.01)
  *B60L 11/18* (2006.01)
  *F02D 41/10* (2006.01)
  *F02D 11/10* (2006.01)
  *B60W 10/115* (2012.01)
  *B60W 10/11* (2012.01)
  *B60W 30/02* (2012.01)

(52) U.S. Cl.
  CPC ........... *B60L 11/14* (2013.01); *B60L 11/1861* (2013.01); *B60L 15/20* (2013.01); *B60L 15/2009* (2013.01); *B60W 10/06* (2013.01); *B60W 10/08* (2013.01); *B60W 10/11* (2013.01); *B60W 10/115* (2013.01); *B60W 20/00* (2013.01); *B60W 30/025* (2013.01); *F02D 11/105* (2013.01); *F02D 41/10* (2013.01); *F02N 11/0822* (2013.01); *B60L 2210/40* (2013.01); *B60L 2220/14* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60L 2270/145* (2013.01); *B60W 2510/1005* (2013.01); *B60W 2520/10* (2013.01); *B60W 2540/10* (2013.01); *B60W 2710/0672* (2013.01); *B60W 2710/085* (2013.01); *B60W 2710/1022* (2013.01); *B60W 2710/1055* (2013.01); *F02D 2250/18* (2013.01); *F02D 2250/26* (2013.01); *Y02T 10/48* (2013.01); *Y02T 10/6221* (2013.01); *Y02T 10/6286* (2013.01); *Y02T 10/645* (2013.01); *Y02T 10/70* (2013.01); *Y02T 10/705* (2013.01); *Y02T 10/7005* (2013.01); *Y02T 10/7044* (2013.01); *Y02T 10/7077* (2013.01); *Y02T 10/7241* (2013.01); *Y02T 10/7275* (2013.01); *Y10S 903/93* (2013.01)

(58) Field of Classification Search
  CPC ... B60W 2510/0275; B60W 2710/027; B60W 2710/083; F16H 2306/42; F16H 2306/44
  USPC ...... 701/22; 180/65.225, 243, 247; 903/945, 903/946
  See application file for complete search history.

(56) References Cited

FOREIGN PATENT DOCUMENTS

| | | |
|---|---|---|
| JP | 2012-153321 A | 8/2012 |
| JP | 2012-157214 A | 8/2012 |
| JP | 2012-170247 A | 9/2012 |

\* cited by examiner

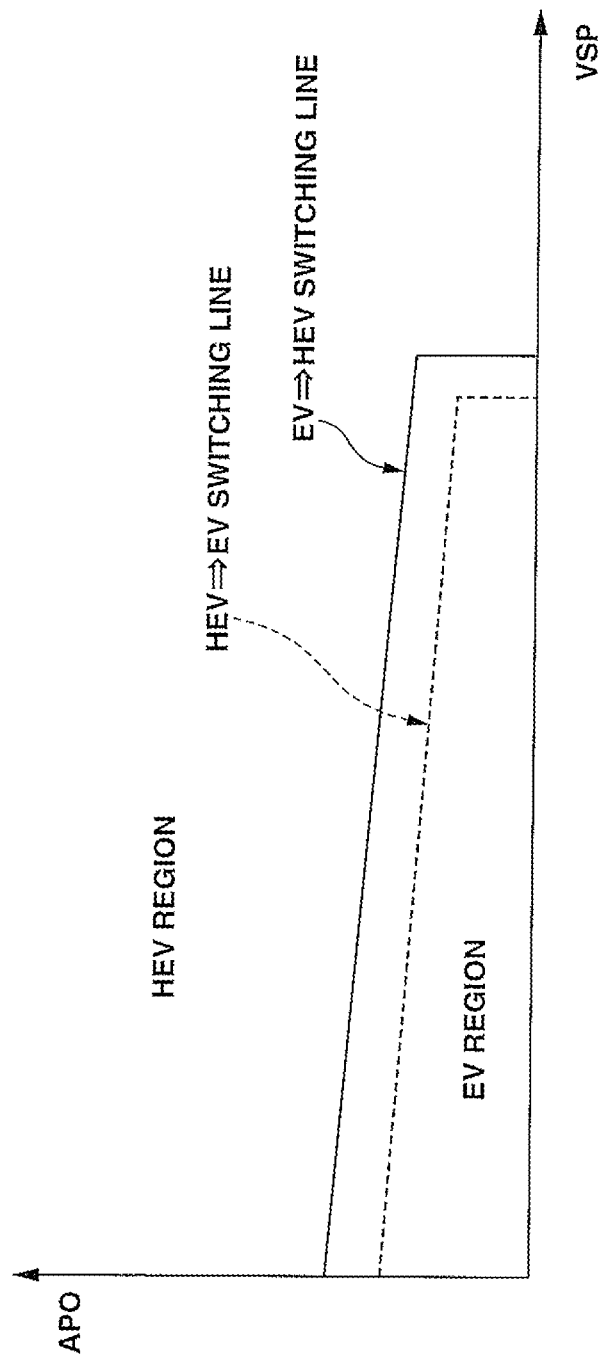

VEHICLE DRIVING-TORQUE CONTROL DEVICE

TECHNICAL FIELD

The present invention relates to a vehicular driving torque control apparatus and particularly relates to a shock reduction technique during an acceleration.

BACKGROUND ART

A vehicular driving torque control apparatus which reduces a shock at a time of an increase of the driving torque is conventionally known as the vehicular driving torque control apparatus (for example, refer to a Patent Document 1). In this Patent Document 1, an acceleration shock is reduced by limiting a rise in a target driving torque determined in accordance with an acceleration manipulation at the time of the increase in a driving torque.

PRE-PUBLISHED DOCUMENT

Patent Document

Patent Document 1: a Japanese Patent Application First Publication (tokkai) 2009-047080 Gazette

DISCLOSURE OF THE INVENTION

Task to be Solved by the Invention

In the above-described conventional technique (Patent Document 1), the driving torque is increased at a time variation gradient, the variation gradient being a steeper gradient as a demanded load becomes larger, being the steeper gradient as a revolution becomes higher, and being a more moderate gradient as a gear stage becomes lower.

However, as described above, the driving torque is made in a more moderate variation gradient, as the gear stage becomes lower. Hence, when the vehicle is again accelerated from a speed reduction state of the vehicle in a low speed region, the variation of the torque becomes moderate so that an acceleration response becomes worsened. On the other hand, if this variation gradient is made large, a twist shock occurs in a drive train at the time of the low geared state so that there is a possibility of giving a vehicular occupant an unpleasant feeling.

With the above-described task in mind, it is an object of the present invention to provide a vehicular driving torque control apparatus which can achieve an improvement in an acceleration response characteristic without giving the unpleasant feeling due to the shock at the time of the increase in the driving torque.

Means for Solving the Task

In order to achieve the above-described object, in a vehicular driving torque control apparatus according to the present invention, a driving torque control section comprises: a variation rate limiting section configured to execute an increase variation rate limiting process in which a variation rate of a target driving torque at a time of an increase in the target driving torque is limited so as not to exceed a limitation variation rate; and a limitation variation rate setting section included in the driving torque control section and configured to set, in a form of the limitation variation rate, a low torque side limitation variation rate used in a low torque side until the target driving torque reaches to a torque variation rate switching threshold value and a high torque side limitation variation rate used in a high torque side exceeding the torque variation rate switching threshold value and to execute a limitation suppression variation rate setting process in which the low torque side limitation variation rate is set to be larger than the high torque side limitation variation rate until the target driving torque reaches to the torque variation rate switching threshold value.

Effect of the Invention

In the vehicular driving torque control apparatus according to the present invention, the limitation suppression variation rate setting process is executed at a time of the increase of the driving torque and, in a low torque region until the target driving torque reaches to the torque variation rate switching threshold value, the low torque side limitation variation rate is set to be larger than the high torque side limitation variation rate. Thus, the acceleration response characteristic can be increased.

In addition, in this low torque region, a twist of a drive train is difficult to be generated. Even if the variation rate at the time of the increase in the driving torque is set to be high, the acceleration shock can be suppressed.

On the other hand, in a high torque region in which the target driving torque exceeds the torque variation rate switching threshold value, the increase variation rate of the driving torque is suppressed to the high torque side limitation variation rate which is smaller than the low torque side limitation variation rate. That is to say, in the high torque region, the twist of the drive train is easy to be generated as compared with the low torque region. Therefore, in the high torque region, the acceleration shock due to the twist of the drive train can be reduced by suppressing the increase variation rate of the driving torque.

As described above, in the present invention, it is possible to achieve an improvement in the acceleration response characteristic without giving the unpleasant feeling due to the shock at the time of the increase in the driving torque.

BRIEF DESCRIPTION OF THE DRAWINGS

FIG. 3 is a view representing an EV-HEV selection map used when a mode selection process in the integrated controller is carried out.

EMBODIMENTS FOR CARRYING OUT THE INVENTION

Figure 1:
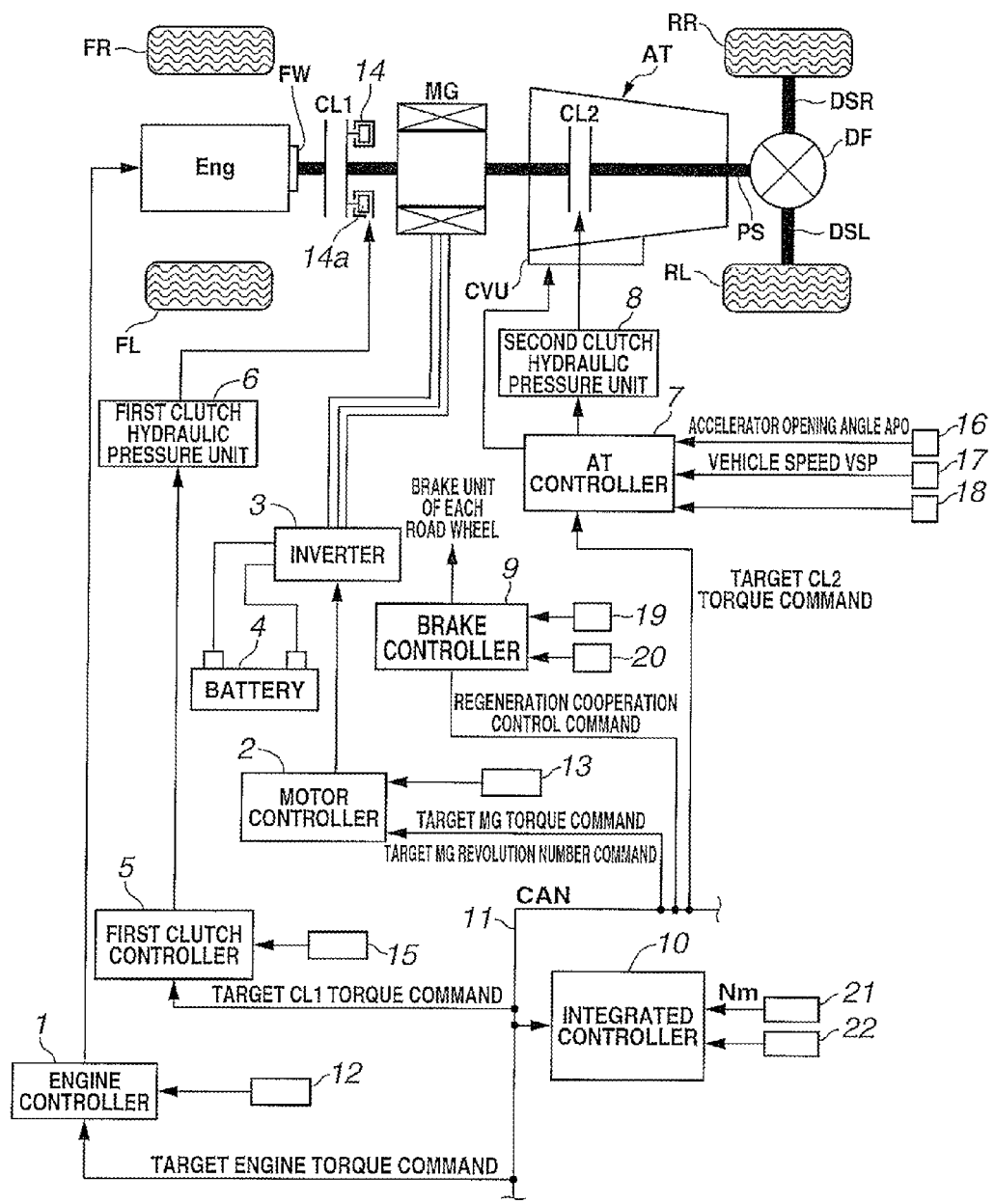
FIG. 1 is a whole system configuration view representing a rear-wheel driven hybrid vehicle to which a vehicular driving torque control apparatus in a first preferred embodiment is applicable.

A best mode to realize a vehicular driving torque control apparatus according to the present invention will, hereinafter, be explained on a basis of a first preferred embodiment shown in the drawings.

First, a structure of the vehicular driving torque control apparatus will be described below.

FIG. 1 is a whole system configuration view representing a rear-wheel driven hybrid vehicle to which the vehicular driving torque control apparatus in the first preferred embodiment is applicable.

A drive train of the hybrid vehicle in the first embodiment, as shown in FIG. 1, includes: an engine Eng; a flywheel FW; a first clutch CL1; a motor generator MG; a second clutch CL2, an automatic transmission AT; a propeller shaft PS; a differential DF; a left drive shaft DSL; a right drive shaft DSR; a left rear road wheel (drive wheel) RL; a right rear road wheel (drive wheel) RR; a left front road wheel FL; and a right front road wheel FR.

Engine Eng is a gasoline engine or a diesel engine. An engine start control, an engine stop control, and a valve opening angle control for a throttle valve are performed on a basis of engine control commands from engine controller 1. It should be noted that flywheel FW is disposed on an engine output shaft.

First clutch CL1 is a clutch intervened between engine Eng and motor generator MG and its engagement and release are controlled including a half clutch state by a first clutch control hydraulic pressure produced by a first clutch hydraulic pressure unit 6 on a basis of a first clutch control command issued from a first clutch controller 5.

Motor generator MG is a synchronous type motor generator in which a permanent magnet is buried in a rotor and a stator coil is wound on a stator and is controlled by applying a three-phase alternating current produced by an inverter 3 on a basis of a control command from a motor controller 2. This motor generator MG can be operated as a motor rotationally driven upon receipt of the electric power supply from a battery 4 (hereinafter, this state is called "a power running"). In a case where the rotor receives a rotary energy from engine Eng and the driving wheels, motor generator MG functions as a power generator in which an electromotive force is generated at both ends of the stator coil and can charge battery 4 (hereinafter, this operation state is called "regeneration"). It should be noted that the rotor of this motor generator MG is linked to an input shaft of automatic transmission AT via a damper.

Second clutch CL2 is a clutch intervened between motor generator MG and left and right rear road wheels RL, RR and its engagement and release are controlled including a slip engagement and a slip release according to a control hydraulic pressure produced by means of a second clutch hydraulic pressure unit 8 on a basis of a second clutch control command from an AT controller 7.

It should be noted that first clutch hydraulic pressure unit 6 and second clutch hydraulic pressure unit 8 are incorporated into an AT hydraulic pressure control valve unit CVU additionally installed in automatic transmission AT.

Automatic transmission AT is a stepwise transmission which automatically switches a gear shift stage of a forward 7-speed/reverse 1-speed in accordance with a vehicle speed and an accelerator opening angle. Second clutch CL2 is not newly added clutch as an exclusive purpose clutch but is selected from an optimum clutch or brake disposed on a torque transmission route from among a plurality of frictional engagement elements engaged at respective gear shift stages of automatic transmission AT. Then, an output shaft of automatic transmission AT is linked to left and right rear road wheels RL, RR via propeller shaft PS, differential DF, left drive shaft DSL, and right drive shaft DSR.

As first clutch CL1, for example, a dry type single plate clutch is used whose engagement and release are controlled by means of a hydraulic pressure actuator 14 having a piston 14*a*.

As second clutch CL2, for example, a wet type multiple plate clutch or wet type multiple plate brake is used in which an oil flow quantity or hydraulic pressure can continuously be controlled through a proportional solenoid. This hybrid driving train has two traveling modes of an electric vehicle traveling mode (hereinafter, referred to as "EV traveling mode") and a hybrid vehicle traveling mode (hereinafter, referred to as "HEV traveling mode"). The EV traveling mode is a mode in which the vehicle is traveling with first clutch CL1 to be opened state and only through the power of motor generator MG. The HEV traveling mode is a mode in which first clutch CL1 is in the engagement state and the vehicle is traveling in any one of an engine traveling mode, a motor assistance traveling mode, and a traveling power generation mode.

Next, a control system of the hybrid vehicle will be explained.

The control system of the hybrid vehicle in the first embodiment will be explained.

The control system of the hybrid vehicle in the first embodiment, as shown in FIG. 1, includes: an engine controller 1; a motor controller 2; an inverter 3; a battery 4; a first clutch controller 5; a first clutch hydraulic pressure unit 6; an AT controller 7; a second clutch hydraulic pressure unit 8; a brake controller 9 and; an integrated controller 10. It should be noted that engine controller 1, motor controller 2, first clutch controller 5, an AT controller 7, brake controller 9, and integrated controller 10 are interconnected via a CAN communication line 11 in which a mutual information exchange is possible.

Engine controller 1 inputs an engine speed (revolution number) information from an engine speed (revolution number) sensor 12, a target engine torque command from integrated controller 10, and other required information. Then, engine controller 1 outputs a command to control an engine operating point (Ne, Te) to a throttle valve actuator of engine Eng and so forth.

Motor controller 2 inputs an information from a resolver 13 detecting a rotor revolution position of motor generator MG, a target MG torque command and a target MG revolution number command from integrated controller 10, and other required information. Motor controller 2 then outputs a command to control a motor operating point (Nm, Tm) of motor generator MG to inverter 3. It should be noted that this motor controller 2 monitors a battery SOC representing a charge capacity of battery 4, this battery SOC information being used for the control information of motor generator MG and being supplied to integrated controller 10 via CAN communication line 11.

First clutch controller 5 inputs a sensor information from a first clutch stroke sensor 15 detecting a stroke position of a piston 14*a* of a hydraulic pressure actuator 14, a target CL1 torque command from integrated controller 10, and other required information.

Then, first clutch controller 5 outputs a command to control the engagement or release of the first clutch CL1 to first clutch hydraulic pressure unit 6 within AT hydraulic pressure control valve unit CVU.

AT controller 7 inputs the information from an accelerator opening angle sensor 16, a vehicle speed sensor 17, and other sensors 18 (transmission input revolution number (speed) sensor, an inhibitor switch, and so forth). Then, when the vehicle is traveling with the selection of D range, AT controller 7 searches for an optimum gear shift stage according to the position of a driving point determined according to an accelerator opening angle APO and vehicle speed VSP which is present on a shift map and outputs a control command obtaining the searched gear shift stage to AT hydraulic pressure control valve unit CVU. In addition, AT controller 7 performs a second clutch control in which a command to control engagement or release of second clutch CL2 is outputted to second clutch hydraulic pressure unit 8 within AT hydraulic pressure control valve unit CVU, in a case where a target CL2 torque command is inputted from integrated controller 10, in addition to the automatic transmission control.

Figure 6:
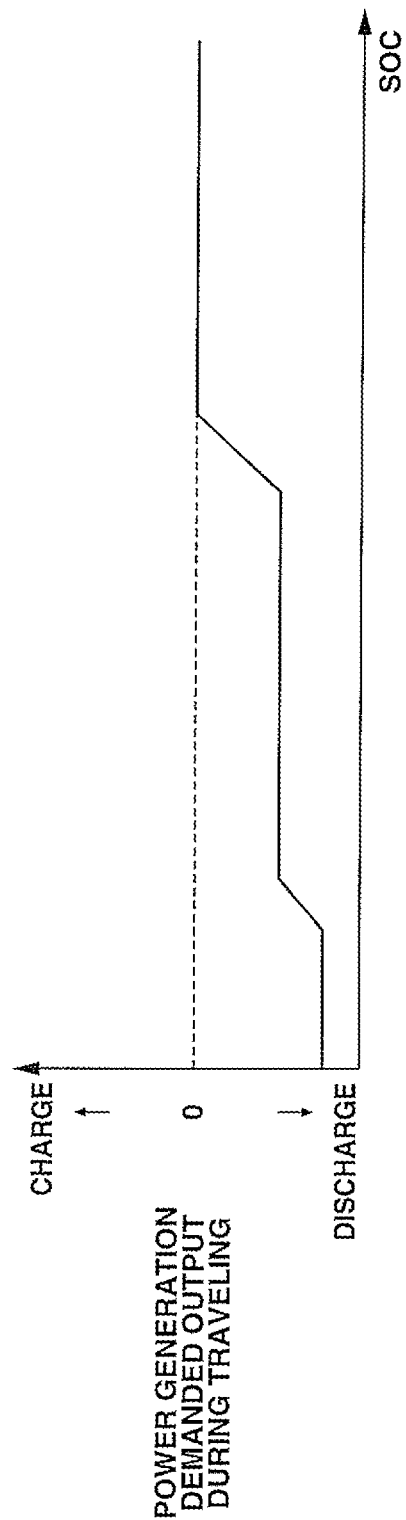
FIG. 6 is a characteristic line diagram representing a target charge/discharge quantity characteristic with respect to a battery charge state of the vehicular driving torque control apparatus in the first preferred embodiment.

It should be noted that the shift map is a map on which an up-shift line and a down-shift line are written in accordance with accelerator opening angle APO and vehicle speed VSP and is exemplified in FIG. 6.

Brake controller 9 inputs sensor information from road wheel speed sensors 19 detecting respective four road wheel speeds and from a brake stroke sensor 20, a regeneration cooperation control command from integrated controller 10, and other required information. Then, for example, in a case where only the regenerative braking force is insufficient for a demanded braking force determined from a brake stroke BS, during a brake depression braking, the regenerative coordinate (regeneration cooperation control) brake control such that its insufficient demanded braking force is compensated by a mechanical braking force (a liquid pressure braking force or a motor braking force) is carried out.

Integrated controller 10 plays an role of managing a consumed energy of a whole vehicle and traveling the vehicle at a best efficiency and inputs the required information from a motor revolution number sensor 21 detecting a motor revolution number Nm and from other sensors and switches 22 and the information via CAN communication line 11. Then, integrated controller 10 outputs a target engine torque command to engine controller 1, a target MG torque command and a target MG revolution number command to motor controller 2, a target CL1 torque command to first clutch controller 5, a target CL2 torque command to an AT controller 7, and a regenerative coordinate (regeneration cooperation) control command to brake controller 9.

Figure 2:
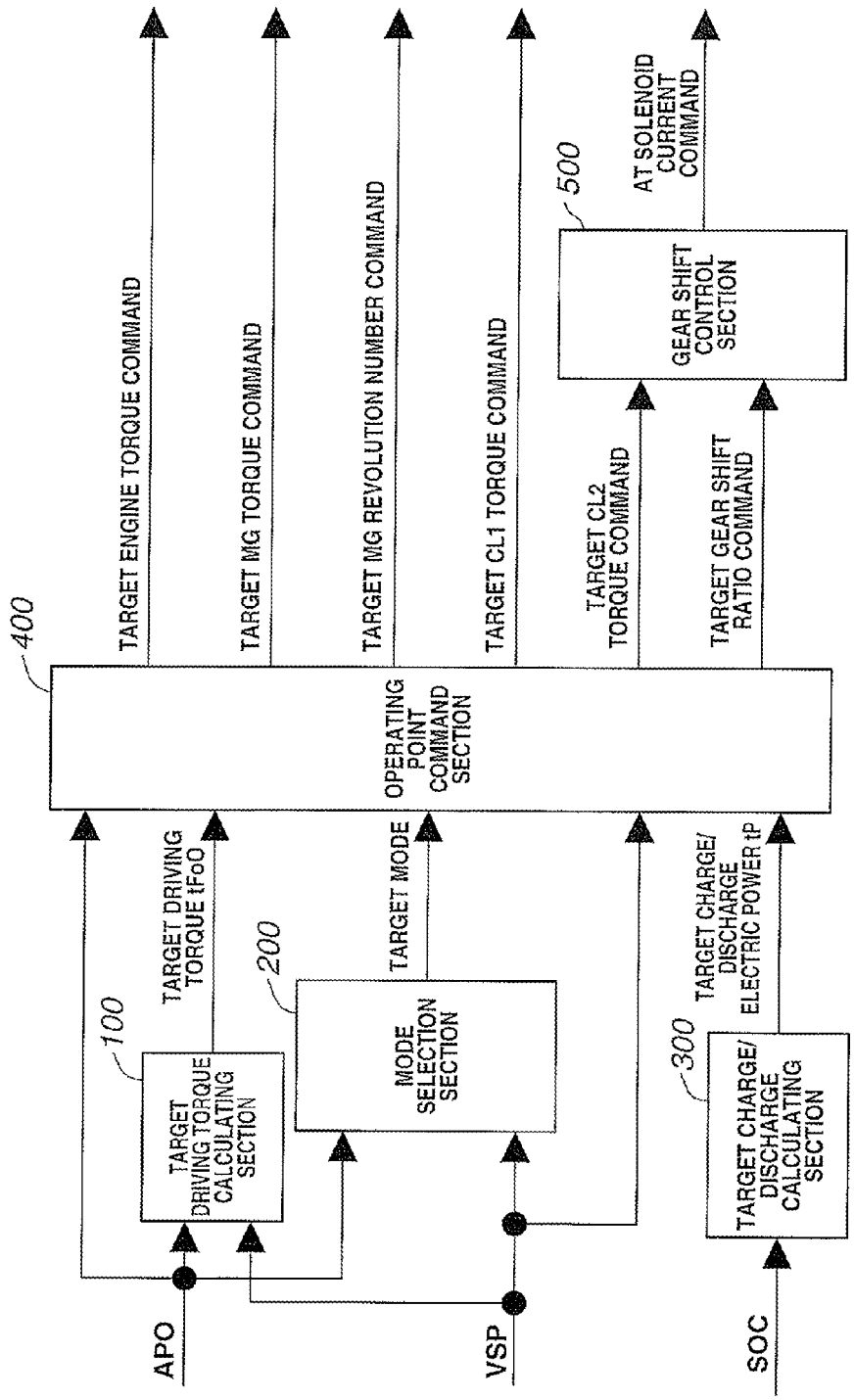
FIG. 2 is a control block diagram representing an arithmetic operation (calculation) processing executed at an integrated controller of the hybrid vehicle to which the vehicular driving torque control apparatus in the first preferred embodiment is applicable.

FIG. 2 is a control block diagram representing a calculation process executed in integrated controller 10 of the hybrid vehicle to which the vehicular driving torque control apparatus in the first preferred embodiment is applicable.

FIG. 3 shows the diagram of representing an EV-HEV selection map used when a mode selection process is carried out in integrated controller 10 of the hybrid vehicle. Hereinafter, the calculation process executed in integrated controller 10 in the first embodiment will be explained on a basis of FIG. 2 and FIG. 3.

Integrated controller 10, as shown in FIG. 2, includes: a target driving torque calculation section 100; a mode selection section 200; a target charge/discharge calculation section 300; and an operating point command section 400.

Figure 4A:
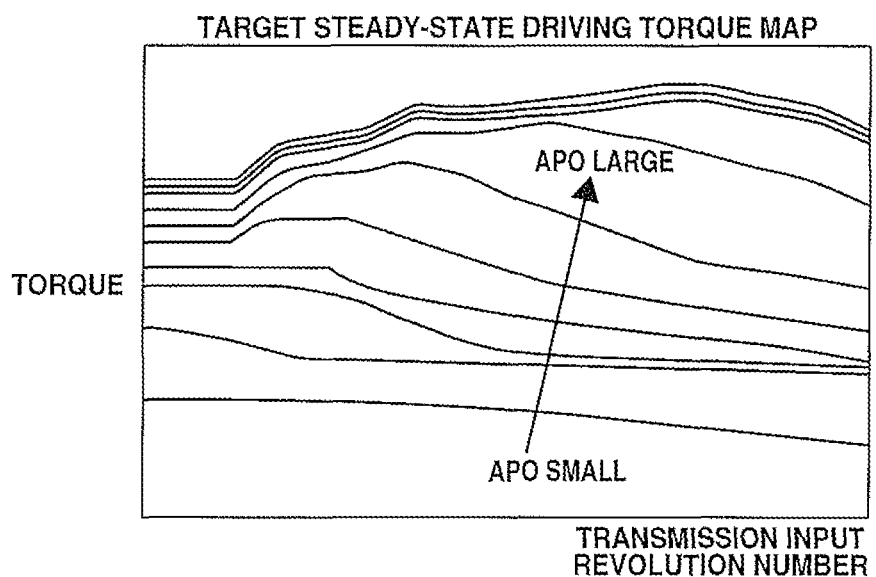
FIG. 4A is a torque map used in a target driving torque calculation section in the vehicular driving torque control apparatus in the first preferred embodiment and a driving force characteristic line map representing a target driving torque characteristic used when a target driving torque is determined.
Figure 4B:
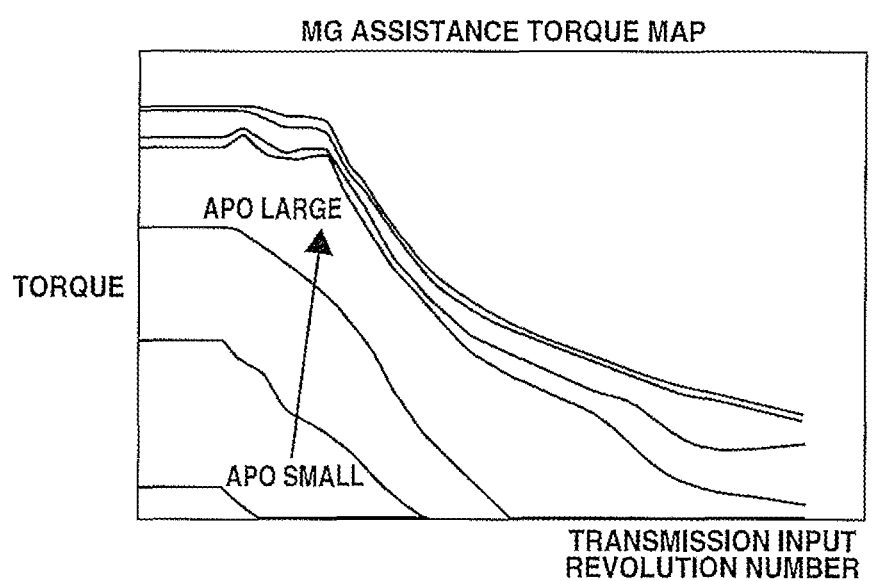
FIG. 4B is a torque map used in the target driving torque calculation section in the vehicular driving torque control apparatus in the first embodiment and an assistance torque map representing an assistance torque characteristic used when an assistance torque of a motor generator is determined by a target driving torque calculation section.

Target driving torque calculation section 100 calculates a target steady state driving torque and an MG assistance torque from a transmission input revolution number which is varied in accordance with vehicle speed VSP and accelerator opening angle APO using a target steady state driving torque map and an MG assistance torque map shown in FIGS. 4A and 4B.

Figure 5:
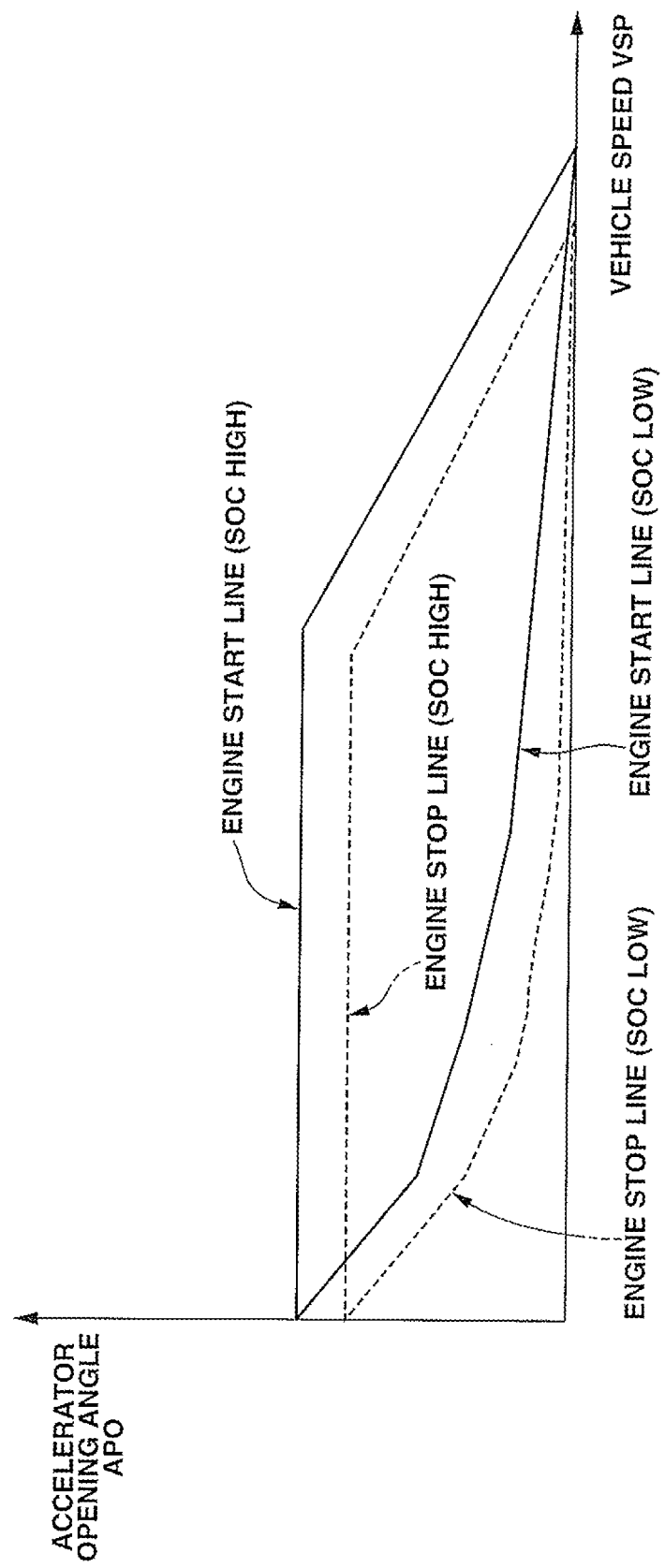
FIG. 5 is a region line diagram representing an electric vehicle (EV) mode region and a hybrid traveling (HEV) mode region in the vehicular driving torque control apparatus.

Mode selection section 200 selects an EV traveling mode or an HEV traveling mode as a target traveling mode using an engine start/stop line map set according to an accelerator opening angle APO set for each of predetermined vehicle speeds as shown in FIG. 5. It should be noted that the engine start line and the engine stop line are reduced in a direction toward which the accelerator opening angle becomes smaller as battery SOC becomes lower.

Figure 7:
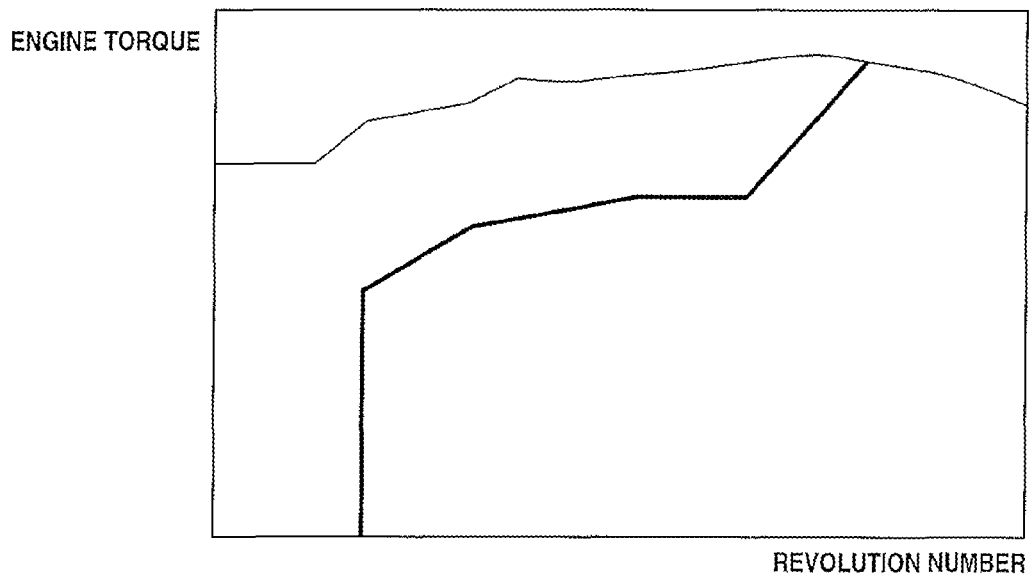
FIG. 7 is an explanatory view for explaining a passage of rise in an engine torque up to a best fuel consumption line in accordance with a vehicle speed in the vehicular driving torque control apparatus in the first preferred embodiment.

Target charge/discharge calculation section 300 calculates a target power generation output on a basis of a battery SOC using a power generation demanded output map during the traveling shown in FIG. 6. In addition, target charge/discharge calculation section 300 calculates an output required to raise an engine torque to a best fuel consumption line denoted by a bold solid line shown in FIG. 7 from the present operating point, compares the output required to raise the engine torque with the target power generation output, and adds one of the outputs which is lesser than the other of the outputs to the engine output as a demanded output.

Operating point command section 400 calculates a transient target engine torque, a target MG torque, a target MG revolution number, a target CL1 torque, a target CL2 torque, and a target gear shift ratio from an accelerator opening angle APO, a target driving torque tFo0, MG assistance torque, a target mode, vehicle speed VSP, and a target charge/discharge power (demanded power generation output) tP with these as operating point arrival targets. The results of calculations are outputted to each of controllers 1, 2, 5, and 7 via CAN communication line 11.

Furthermore, operating point command section 400 executes an engine start process.

That is to say, mode selection section 200 performs a mode switch from the EV traveling mode to the HEV traveling mode accompanied with the engine start when a driving point determined by a combination of accelerator opening angle APO and vehicle speed VSP during the EV traveling is passed over an EV HEV switching line and enters the HEV region. In addition, mode selection section 200 performs the traveling mode switching from the HEV traveling mode to the EV traveling mode accompanied with an engine stop and an engine separation when the driving point is passed over an HEV→EV switching line and enters the EV region during the HEV traveling.

Operating point command section 400 performs a start process at a time point at which accelerator opening angle APO is passed over an engine start line shown in FIG. 5 in the EV traveling mode, in response to this traveling mode switching. This start process is such that a torque capacity is controlled for second clutch CL2 to be slipped in a half clutch state and an engagement of first clutch CL1 is started to raise the engine revolution after a determination is made for a start of slip of second clutch CL2. Then, when the engine revolution reaches to an initial explosion enabling revolution, engine Eng is operated and first clutch CL1 is completely engaged when the motor revolution number approaches the engine revolution number and, thereafter, second clutch CL2 is locked up and the HEV traveling mode is transferred.

Figure 8:
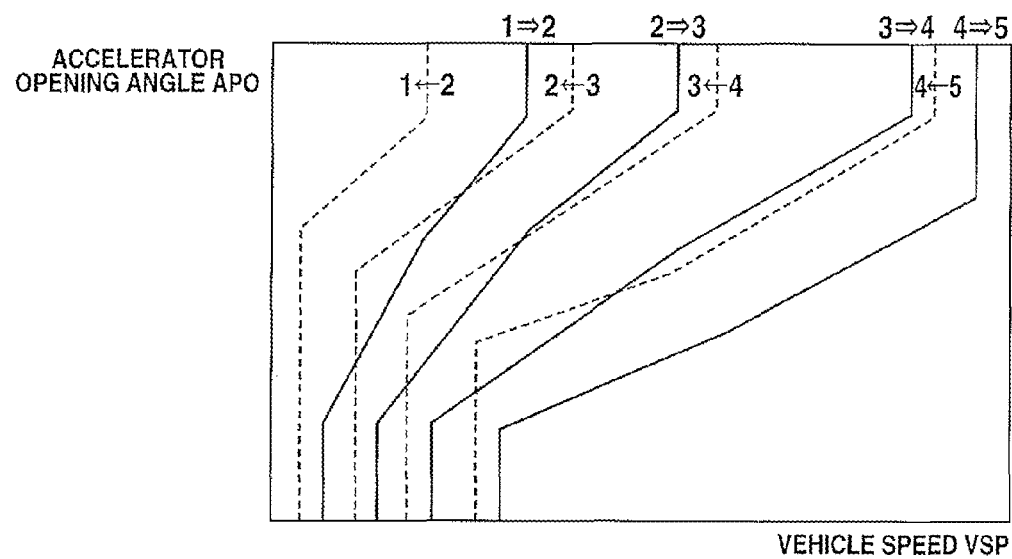
FIG. 8 is a gear shift characteristic line diagram for setting a gear shift ratio in an AT controller performing a gear shift control of an automatic transmission to which the vehicular driving torque control apparatus in the first embodiment is applied.

Gear shift control section 500 drivingly controls a solenoid valve within automatic transmission AT to achieve these target CL2 torque capacity and the target shift ratio from the target CL2 torque capacity and the target shift ratio. FIG. 8 shows gear shift lines. That is to say, gear shift control section 500 determines a subsequent gear shift stage from the present gear shift stage on a basis of vehicle speed VSP and accelerator opening angle APO and controls a gear shift clutch to make a gear shift if a gear shift demand is present.

In the driving torque control at operating point command section 400, during an increase of the driving torque, the following increase variation rate limiting process to limit the driving torque in order to reduce an acceleration shock and gear backlash eliminating torque limiting process are executed according to the necessity.

Figure 9:
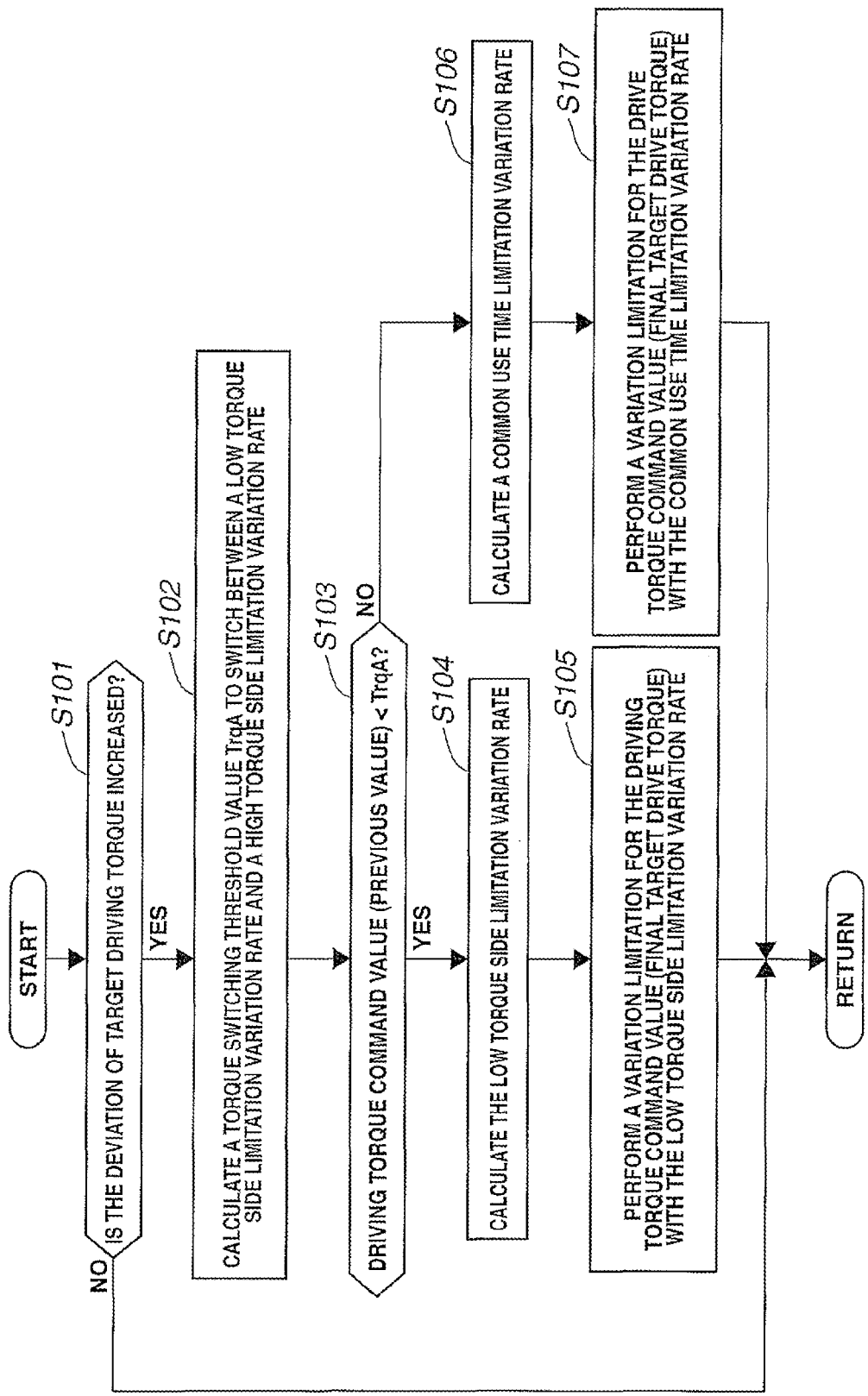
FIG. 9 is a control flowchart representing a flow of an increase variation rate limiting process of limiting a variation rate at the time of increase in the driving torque in the vehicular driving torque control apparatus in the first preferred embodiment.
Figure 10:
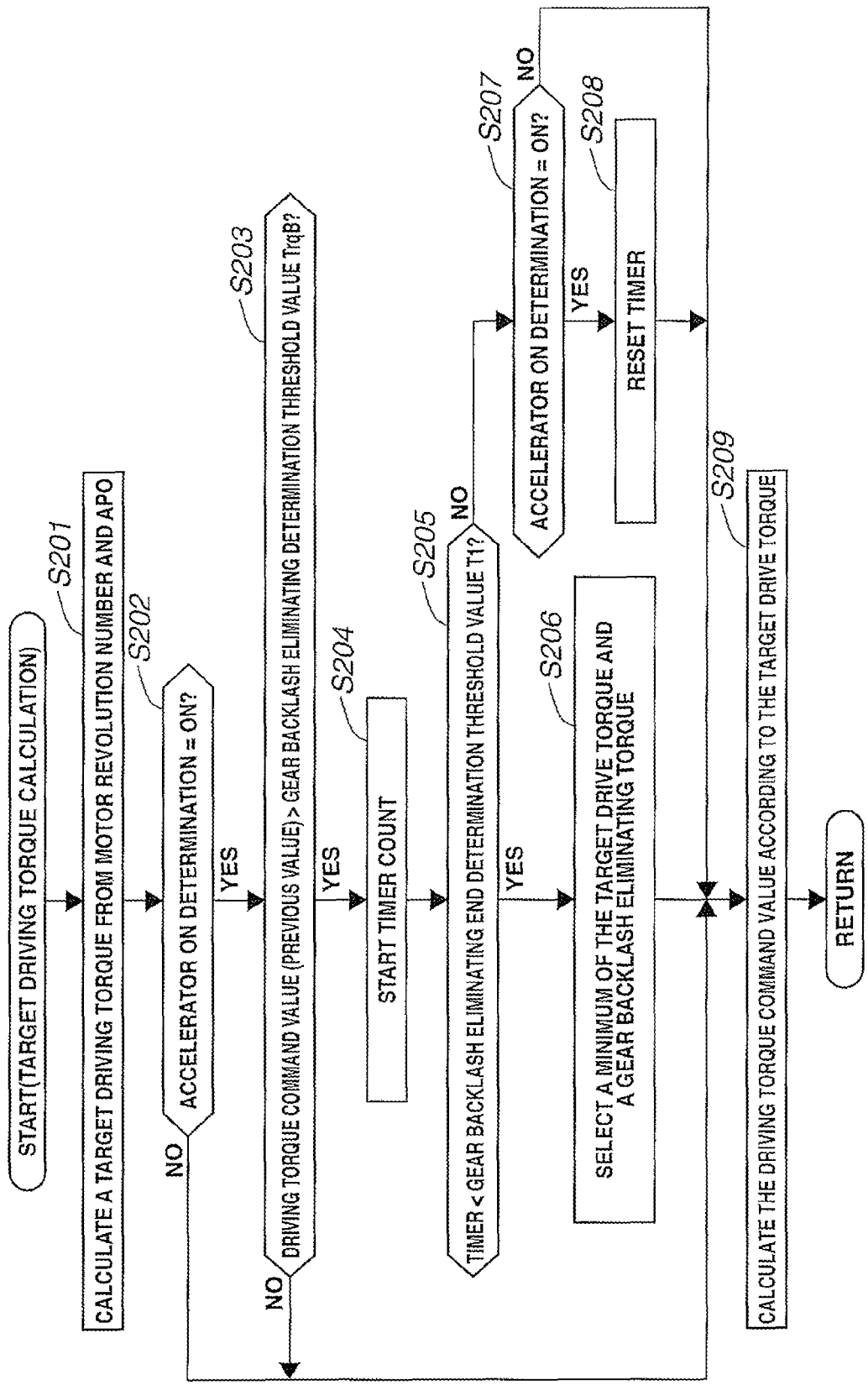
FIG. 10 is a control flowchart representing a flow of a gear backlash eliminating process in the vehicular driving torque control apparatus in the first preferred embodiment.

FIG. 9 shows a control flowchart representing a flow of the increase variation rate limiting process and FIG. 10 shows a control flowchart representing a flow of the gear backlash eliminating torque limiting process.

First, the flow of the increase variation rate limiting process for setting a variation rate during the increase of the driving torque will be explained on a basis of the flowchart shown in FIG. 9.

At a step S101, operating point command section 400 determines whether a deviation of target driving torque tFo0 calculated at target driving torque calculation section 100 (a difference between a value of a previous control timing and a value of the present control timing) is increased. If increased, the routine goes to a step S102. If decreased, one processing is ended and the routine goes to a return.

At step S102, operating point command section 400 calculates a torque variation rate switching threshold value TrqA to switch a high torque side limitation variation rate and a low torque side limitation variation rate and the routine goes to the next step of a step S103.

Figure 11:
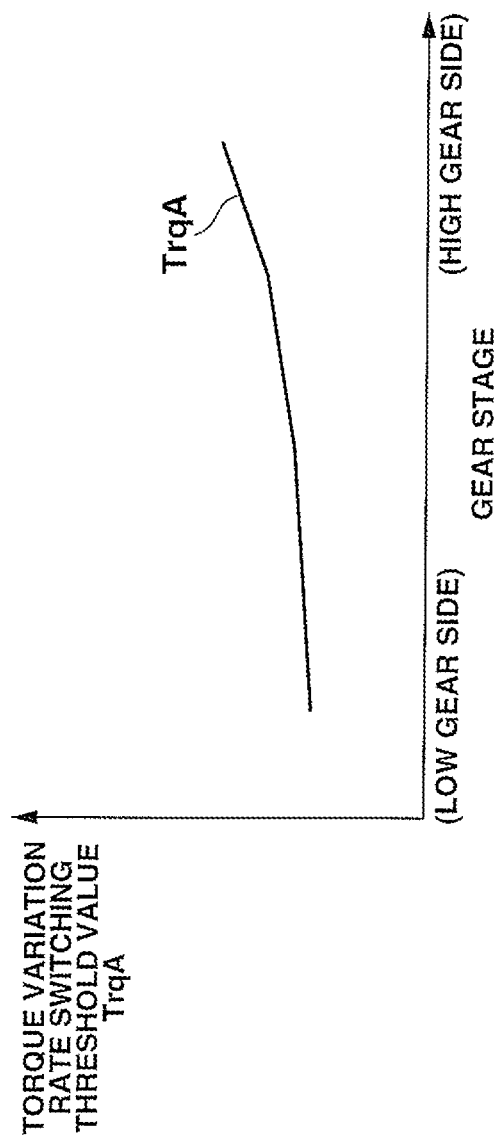
FIG. 11 is a torque variation rate switching threshold value map used for a calculation of a torque variation rate switching threshold value for switching between a high torque side limitation variation rate and a low torque side limitation variation rate in an increase variation rate limiting process of the vehicular driving torque control apparatus in the first preferred embodiment.

This torque variation rate switching threshold value TrqA is calculated in accordance with a gear stage (the present shift stage) using a torque variation rate switching threshold value map shown in FIG. 11 and is set to be a larger value as the gear shift stage becomes higher (higher gear).

It should be noted that the gear stage shown in a lateral axis in FIG. 11 is such that the gear shift stage becomes higher (a fifth-speed side) as the lateral axis goes to a more rightward side and becomes lower (a first-speed side) as the lateral axis goes to a more leftward side.

This torque variation rate switching threshold value TrqA is a threshold value to determine whether the driving torque inputted to automatic transmission AT is a high torque such that a twist shock is generated or a low torque such that the twist shock is not generated and is determined according to specifications of a driving force transmission route of the vehicle.

At the next step S103, the determination is made whether a previous driving torque command value (a total of the engine torque and MG torque) is below torque variation rate switching threshold value TrqA. If driving torque command value <TrqA, the routine goes to a step S104. If driving torque command value ≥TrqA, the routine goes to a step S106.

Steps S104 and S106 advanced after the determination at step S103 are steps at which the limitation variation rate for limiting the increased side of the variation rate is calculated to make a response to target driving torque tFo0 delay, respectively.

At step S104 to which, if the driving torque <TrqA, the routine goes, a low torque side limitation variation rate is calculated and, thereafter, the routine goes to a step S105. The low torque side limitation variation rate is set on a basis of a variation rate limitation value map shown in FIG. 12 according to vehicle speed VSP and accelerator opening angle APO. The setting of this low torque side limitation variation rate is different according to accelerator opening angle APO. That is to say, in a case where accelerator opening angle APO is relatively large (a depression angle of an accelerator is deep), the low torque side limitation variation rate is set to be larger than an common use (time) limitation variation rate (a high torque side limitation variation rate) denoted by a dot line in FIG. 12.

Figure 12:
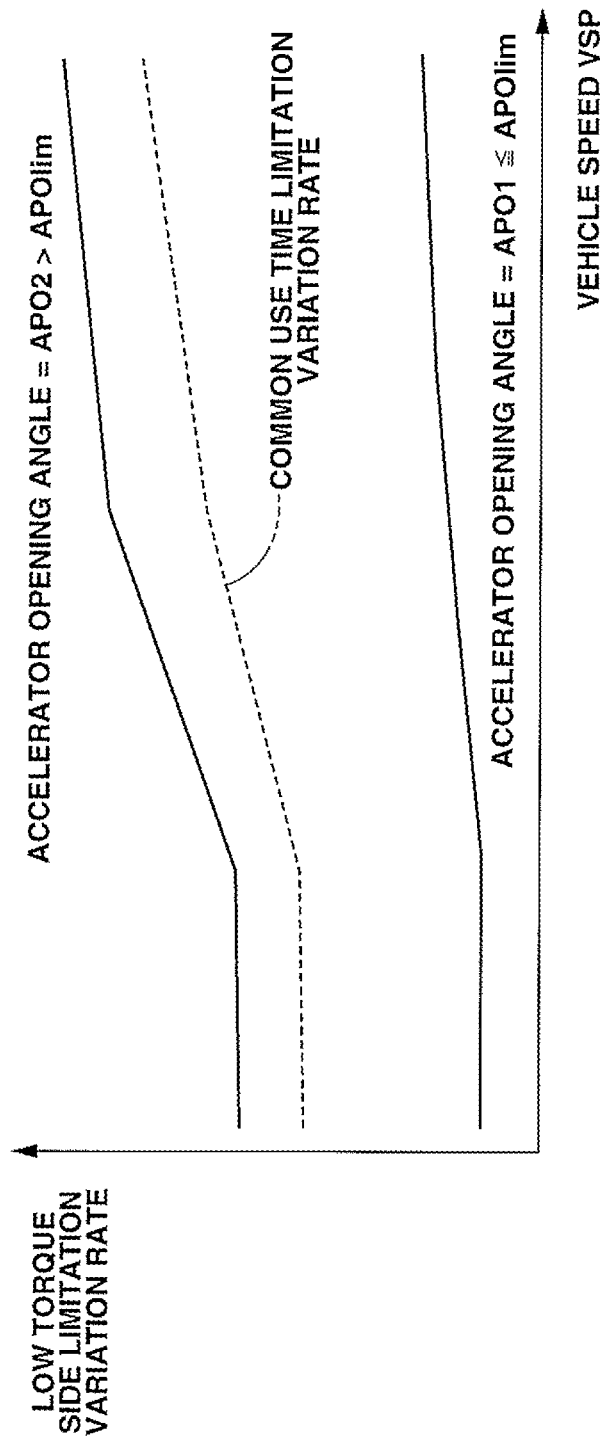
FIG. 12 is a variation rate limitation value map used for a calculation for a low torque side limitation variation rate in an increase variation rate limiting process of the vehicular driving torque control apparatus in the first preferred embodiment.

On the other hand, in a case where accelerator opening angle APO is relatively small (a depression of the accelerator is shallow), the low torque side limitation variation rate is set to be smaller than the common use (time) limitation variation rate (a variation rate of the high torque side limitation) denoted by the dot line shown in FIG. 12.

It should, herein, be noted that, whether accelerator opening angle APO is large or small is determined whether accelerator opening angle APO is larger than an accelerator opening angle threshold value APOlim set to determine whether a driver's acceleration intention is large or small. This accelerator opening angle threshold value APOlim is, for example, set to a value to a degree that accelerator opening angle APO can be divided into a one digit number and a two digit number. Thus, if accelerator opening angle APO is equal to or larger than APO2 shown in FIG. 2 which is larger than accelerator opening angle threshold value APOlim, for example, the acceleration intention is large when a two digit angle of equal to or larger than 10 degrees, the low torque side limitation variation rate is set to a value larger than the common use (time) limitation variation rate. On the other hand, if accelerator opening angle APO is smaller than APO1 shown in FIG. 12 which is equal to or smaller than accelerator opening angle APOlim, for example, at an opening angle of one digit angle smaller than 10 degrees, the acceleration intention is small and the low torque side limitation variation rate is set to a value equal to or lower than the common use (time) limitation variation rate (may be equal to the common use (time) limitation variation rate). It should be noted that the setting of accelerator opening angle threshold value APOlim may be in accordance with a vehicular characteristic and may appropriately be a reflection on a degree of the acceleration intention, and may be set to an optimum value by which an effect described above can be exhibited. It should be noted that, at step S105 to which the routine goes after the execution of the process at step S104, the low torque value limitation variation rate limits the increase of the driving torque command value (a final target driving torque) and, thereafter, the routine goes to a return.

Figure 13:
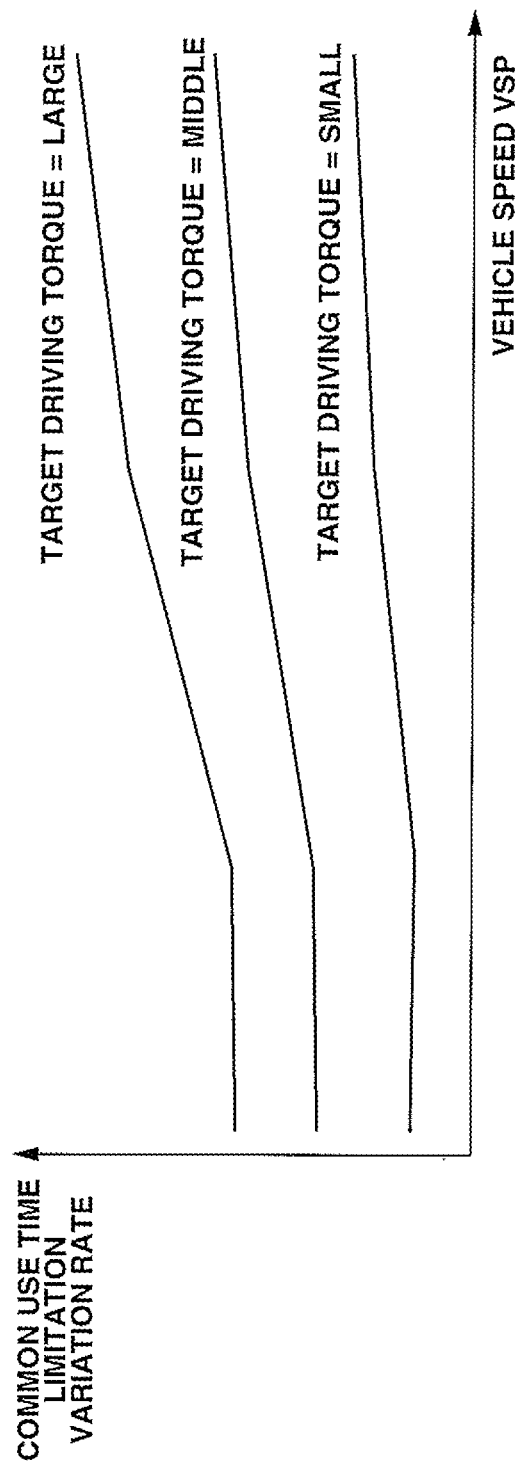
FIG. 13 is a common use (time) limitation variation rate limitation value map used for the calculation of a common use (time) limitation variation rate limitation value (a high torque side variation rate limitation value) in the increase variation rate limiting process of the vehicular driving torque control apparatus in the first preferred embodiment.

At step S106 to which the routine goes if the driving torque command value ≥TrqA at step S103, after the calculation of common use (time) limitation variation rate (the high torque side limitation variation rate), the routine goes to a step S107. It should, herein, be noted that the common use (time) limitation variation rate is set on a basis of a common use (time) limitation variation rate map shown in FIG. 13 in accordance with target driving torque tFo0 and vehicle speed VSP. That is to say, as shown in FIG. 13, the common use (time) limitation variation rate is set to be larger as vehicle speed VSP becomes higher. Furthermore, target driving torque tFo0 is preset to three stages of "large", "middle", and "small" and, as target driving torque tFo0 becomes larger, the common use (time) limitation variation rate is set to be larger.

After the increase of the driving torque command value (final target driving torque) is, at step S107, limited by means of the common use (time) limitation variation rate (the high torque side limitation variation rate), the routine goes to the return.

Next, on a basis of a flowchart of FIG. 10, a flow of a gear backlash eliminating torque limiting process which limits the driving torque when the target driving torque is switched from a negative torque to a positive torque will be explained. It should be noted that this gear backlash eliminating torque limiting process is started at a time point at which a traveling state of the vehicle becomes a coast traveling state of zero accelerator opening angle APO.

At step S201, target driving torque tFo0 is calculated on a basis of the output revolution number and accelerator opening angle APO and, thereafter, the routine goes to a step S202. This target driving torque tFo0 is calculated on a basis of a target steady state torque map shown in FIG. 4A by target driving torque calculation section 100.

At the next step S202, a determination of whether the accelerator is ON is made. In a case where the accelerator is ON (accelerator opening angle APO>0), the routine goes to a step S203. In a case where the accelerator is OFF (accelerator opening angle APO=0), the routine goes to a step S209.

At step S203 to which the routine goes in a case where the accelerator is ON (APO>0), a determination of whether a previously outputted driving torque command value is in excess of a gear backlash eliminating determination threshold value TrqB is made. If the previously outputted torque command value is in excess of the backlash eliminating determination threshold value TrqB, the routine goes to a step S204. If not in excess of backlash eliminating determination threshold value TrqB, the routine goes to a step S209. It should be noted that this backlash eliminating determination threshold value TrqB is a value smaller than 0 but is near to 0 and is a value determining the switching (a variation from the negative torque to the positive torque) from a coasting traveling state to a drive traveling state.

At step S204, a counting of a timer to count an execution time of the gear backlash eliminating torque limiting process is started. Thereafter, the routine goes to a step S205.

At step S205, a determination of whether the count value of the timer is smaller than a preset gear backlash eliminating end determination threshold value T1. Then, if the count value of the timer is smaller than gear backlash eliminating end determination threshold value T1, the routine goes to a step S206. If the count value of the timer is equal to or larger than gear backlash eliminating end determination threshold value T1, the routine goes to a step S207.

Figure 14:
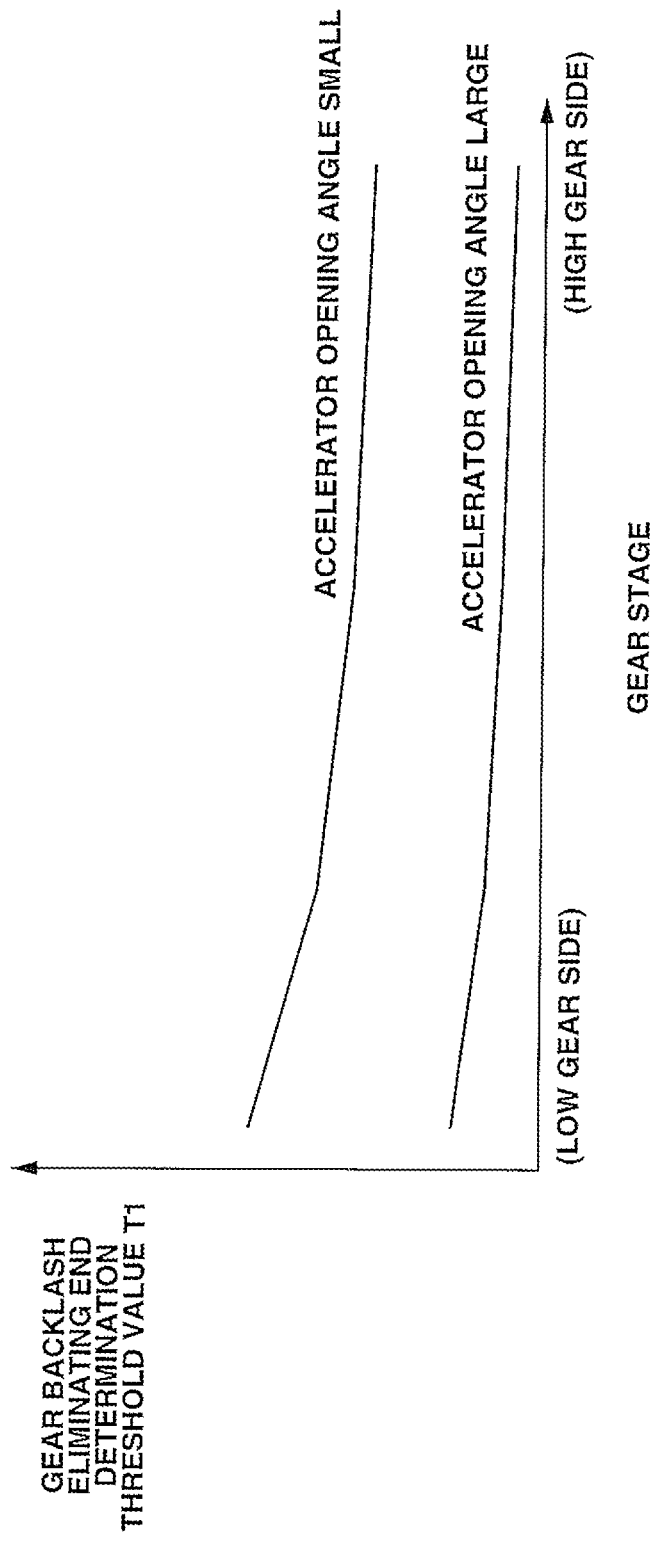
FIG. 14 is a gear backlash eliminating end determination threshold value map used for the calculation of a gear backlash eliminating end determination threshold value in a backlash eliminating torque control of the vehicular driving torque control apparatus in the first preferred embodiment.

It should be noted that gear backlash eliminating end determination threshold value T1 is set on a basis of the gear shift stage and accelerator opening angle APO, as shown in FIG. 14. That is to say, gear backlash eliminating end determination threshold value T1 is set to a shorter time as the gear shift stage becomes higher.

In addition, two kinds of characteristics are set for backlash eliminating end determination threshold value in accordance with a magnitude of accelerator opening angle APO. In a case where accelerator opening angle APO is large, backlash eliminating end determination threshold value T1 is set to be shorter time as compared with a case where accelerator opening angle APO is small. It should be noted that, in the first embodiment, the characteristic of backlash eliminating end determination threshold value T1 in accordance with accelerator opening angle APO is set only to the two kinds. However, the present invention is not limited to this. The characteristic of backlash eliminating end determination threshold value T1 can be set to a plural stages of 3 or more or can be set in proportion to accelerator opening angle APO using a calculation formula.

At step S206 to which the routine goes in a case where the count value of the timer is smaller than gear backlash eliminating end determination threshold value T1, a selection of a smaller value between target driving torque tFo0 including target driving torque tFo0 limited in the increase variation rate limiting process and a gear backlash eliminating torque is made and the routine goes to a step S209.

Figure 15:
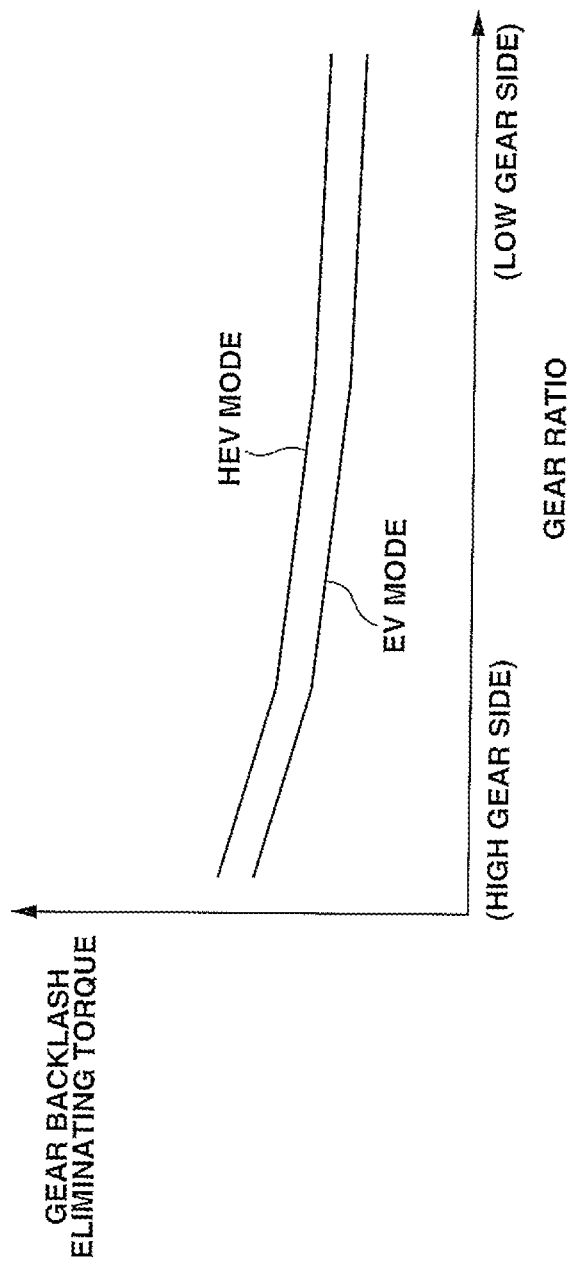
FIG. 15 is a gear backlash eliminating torque map used for a calculation of a gear backlash eliminating torque in a backlash eliminating torque control of the vehicular driving torque control apparatus in the first preferred embodiment.

It should be noted that the gear backlash eliminating torque is calculated in accordance with the gear ratio and the traveling mode on a basis of a gear backlash eliminating torque map shown in FIG. 15. It should be noted that the gear backlash eliminating torque is set to be lower as the gear ratio becomes higher (lower gear side). In addition, the gear backlash eliminating torque is set depending upon whether the traveling mode is the EV traveling mode or the HEV traveling mode. In a case of the HEV traveling mode, the backlash eliminating torque is set to be a higher value than the case of the EV traveling mode.

On the other hand, at step S207 to which the routine goes in a case where the count value (a passage time from the start of execution of the gear backlash eliminating torque limiting process) of the timer is equal to or larger than backlash eliminating end determination threshold value T1 at step S205, the accelerator ON determination is made. That is to say, if accelerator opening angle APO>0, the routine goes to a step S208. If accelerator opening angle APO=0 (=accelerator OFF), the routine goes to a step S209.

At a step S208 to which the routine goes in a case of the accelerator ON, the timer is reset. Thereafter, the routine goes to step S209.

At step S209 to which any one of steps of S202, S206, S207, and S208 is advanced, the driving torque command value which accords with the finally determined target driving torque tFo0 is calculated. Thereafter, the routine advances to the return. That is to say, target driving torque tFo0 set in accordance with accelerator opening angle APO and vehicle speed VSP, a target driving torque tFo0 determined by the increase variation rate limiting process in FIG. 9, and the driving torque command value in accordance with a select low value of the gear backlash eliminating torque are calculated by target driving torque calculation section 100.

Action of the First Embodiment

Next, an action of the first embodiment will be explained by dividing the action of the first embodiment into the following four cases and by comparing with a comparative example on the basis of timing charts.

A case where the demanded torque in the drive traveling state is large.

A case where the demanded torque in the drive traveling state is small.

A case where the demanded torque when the change from the coasting traveling state to the drive traveling state occurs is large.

A case where the demanded torque when the change from the coasting traveling state to the drive traveling state occurs is small.

(the case where the demanded torque in the drive traveling state is large)

First, the case where the driver demanded torque (target driving torque) in the drive traveling state is larger than torque variation rate switching threshold value TrqA.

Figure 16:
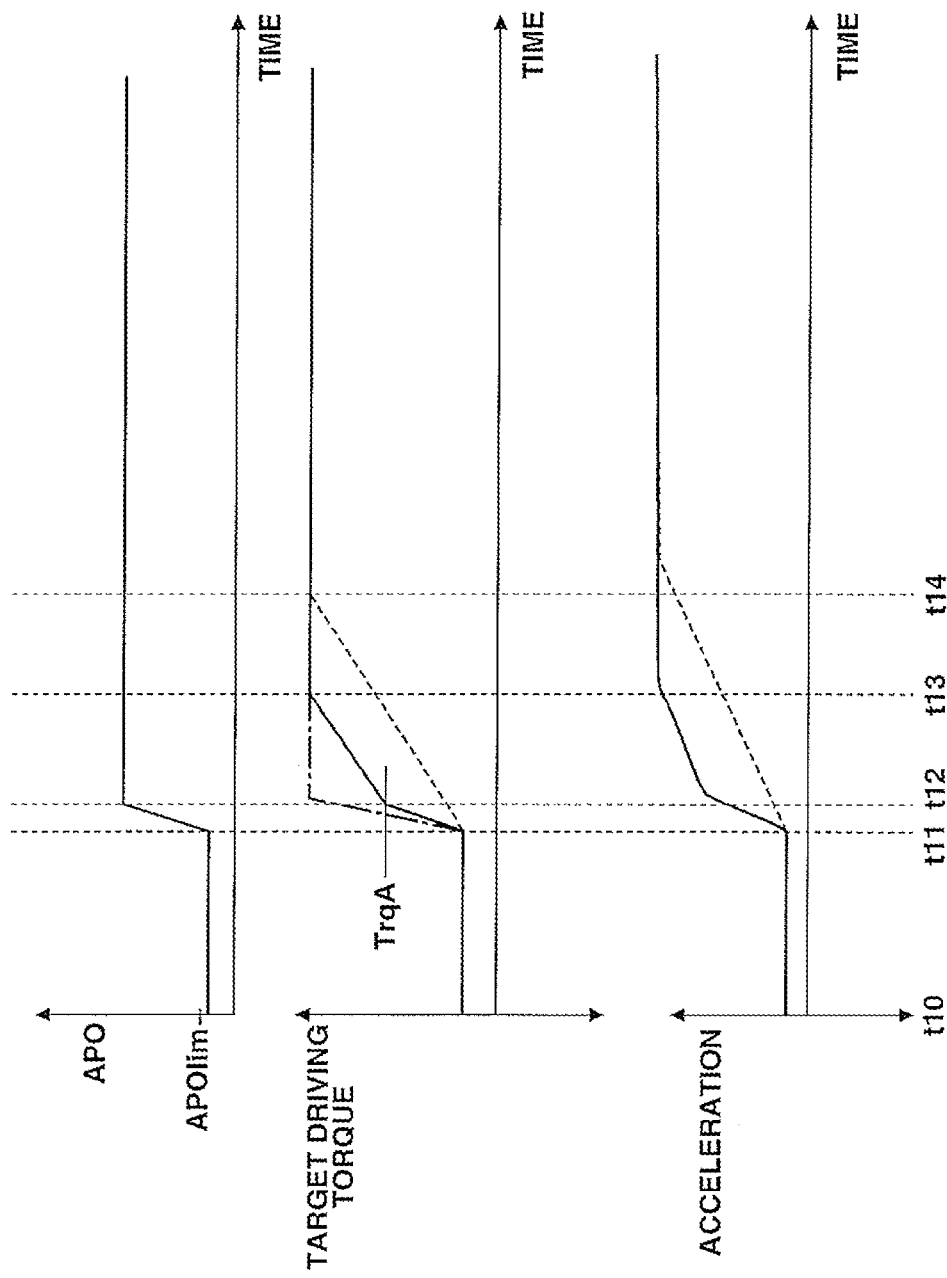
FIG. 16 is a timing chart representing an operation example between the vehicular driving torque control apparatus in the first preferred embodiment and a comparative example in a case where a demanded torque in a drive traveling state is large.

FIG. 16 is a timing chart representing operation examples of the comparative example and the first embodiment in a case where the target driving torque determined according to the driver demanded torque in the drive traveling state is larger than torque variation rate switching threshold value TrqA.

In these operation examples, the driver maintains the drive traveling state in which, during a time interval between t10 and t11, accelerator opening angle APO is constant. Then, the driver starts an acceleration operation at a time point of t11, depresses the accelerator pedal (not shown) up to a time point t12 to increases accelerator opening angle APO, and, thereafter, maintains the depressed state of the accelerator pedal.

The target driving torque tFo0 determined in accordance with this accelerator operation is set to a value in accordance with accelerator opening angle APO up to a time point of t11. In this interval, no increase variation rate limiting process is carried out since No determination of step S101 is made in flowchart of FIG. 9.

Thereafter, when, at the time point of t11, the accelerator pedal (not shown) is depressed, target driving torque tFo0 set in accordance with accelerator opening angle APO is raised at a variation rate (increase rate) denoted by a dot-and-dash line in accordance with the depression operation.

Comparative Example

In a case where the above-described (acceleration) operation is carried out, in the comparative example, the target driving torque is limited at a constant variation rate corresponding to the common use (time) limitation variation rate in the first preferred embodiment as denoted by a dot line in FIG. 16. That is to say, in this comparative example, the variation rate of target driving torque tFo0 is limited to the constant variation rate determined in accordance with the demanded torque, the revolution number, the gear ratio, and so forth.

Therefore, although an acceleration shock can be reduced, the driver gives a sense of difference such that the acceleration feeling is insufficient with respect to the acceleration operation of the driver.

On the other hand, in order to eliminate such a sense of difference, in a case where the torque increase limitation is relieved and the variation rate is abruptly set, there is a possibility that the acceleration shock due to a twist of the drive train.

Operation of the First Embodiment

As compared with the above-described comparative example, in the first embodiment, the driving torque command value is limited by the low torque side limitation variation rate until target driving torque tFo0 reaches to torque variation rate switching threshold value TrqA on a basis of the process of step S103→S104→S105 of the flowchart in FIG. 9.

This low torque side limitation variation rate is set to a value larger than the common use (time) limitation variation rate since accelerator opening angle APO is in excess of accelerator opening angle threshold value APOlim in a case where the demanded torque is large as in the operation example of FIG. 16 on a basis of a low torque side limitation variation rate limitation value map shown in FIG. 12. That is to say, the limitation is suppressed on a basis of a limitation suppression variation rate setting process.

Thus, the variation rate of target driving torque tFo0 is limited than target driving torque tFo0 denoted by a dot-and-dash line in accordance with the operation of the driver, as denoted by a solid line in FIG. 16. However, target driving torque tFo0 is raised by a more abrupt gradient low torque side limitation variation rate than the increase limitation variation rate denoted by a dot line of the comparative example.

In this way, in the first embodiment, while the limitation is carried out through the low torque side limitation variation rate, the acceleration feeling more approximate to the accelerator pedal operation by the driver than the comparative example can be obtained. Then, since the driving torque itself is, at this time, relatively low value, a generation of an acceleration shock due to the twist of the drive train is suppressed.

Thereafter, after a time point of t12 at which target driving torque tFo0 has reached to torque variation rate switching threshold value TrqA, the limitation suppression variation rate setting process is cancelled and target driving torque tFo0 is limited by the common use (time) variation rate which serves as the high torque side limitation variation rate.

In this way, in a high torque region in which target driving torque tFo0 is relatively high so that the twist of the drive train can be generated, the variation rate of the increase of target driving torque tFo0 is suppressed to be low by the common use (time) limitation variation rate so that as the generation of the acceleration shock can be suppressed.

Thereafter, at a time point at which target driving torque tFo0 increased at the high torque side variation rate is made coincident with original target driving torque tFo0 which is in accordance with accelerator opening angle APO, the increase variation rate limiting process is ended. That is to say, at the time point of t13, the deviation from the previous value of target driving torque tFo0 becomes zero and no determination is made at step S101 of the flowchart in FIG. 9 so that the limitation of the variation rate at either step S105 or S107 is not executed.

As described above, the end timing of the increase side variation rate limiting process is a time point t14 in the case of the comparative example but in the case of the first embodiment is a time point t13 which is before time point t14 in the case of the comparative example. In the first embodiment, a totally high acceleration feeling than the conventional one in which the end timing is ended at the time t14 can be obtained.

When comparing the first embodiment with the comparative example in terms of an actual acceleration variation, in the case of the first embodiment denoted by the solid line in FIG. 16, a time duration during which the acceleration is raised becomes short as compared with the comparative example denoted by a dot line in FIG. 16 so that a high acceleration feeling can accordingly be obtained.

(A Case where the Demanded Torque is Small in the Drive Traveling State)

Next, an operation in a case where a driver's depression depth of the accelerator pedal (not shown) is shallow, accelerator opening angle APO does not reach to an accelerator opening angle threshold value APOlim, and the demanded torque is small will be described below.

Figure 17:
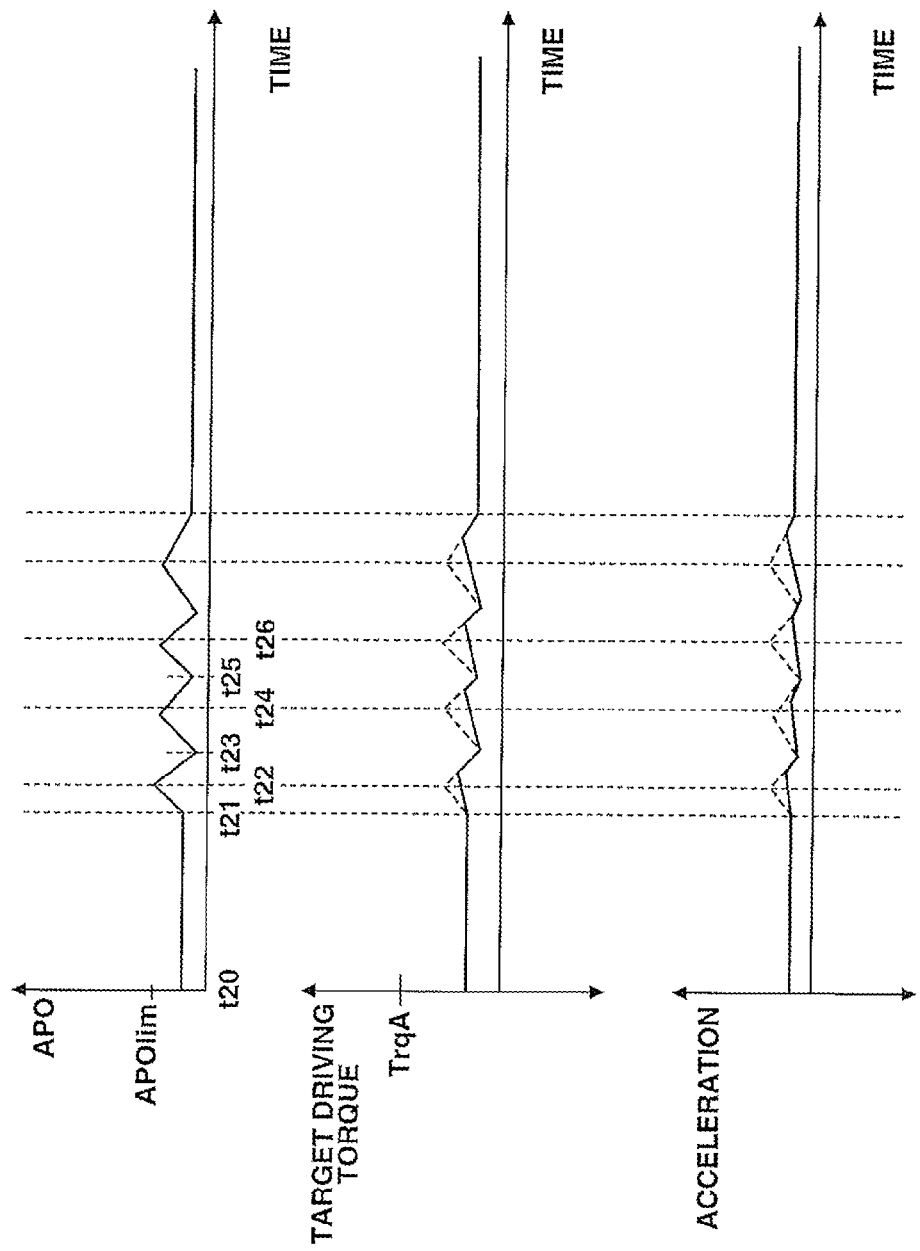
FIG. 17 is a timing chart representing an operation example between the vehicular driving torque control apparatus in the first preferred embodiment and a comparative example in a case where the demanded torque in the drive traveling state is small.

FIG. 17 shows an operation example in a case where a depression increase and a depression return are repeated in a range in which the depression depth of the accelerator pedal (not shown) is shallow.

That is to say, accelerator opening angle APO is constant during the time interval from a time point t20 to a time point t21. Thereafter, at a time point t21, the depression increase of the accelerator pedal (not shown) is started and, thereafter, a depression return operation is carried out from a time point t22 to a time point t23. Furthermore, the depression increase of the accelerator pedal (not shown) is again carried out from a time point t23 to a time point t24. The depression return is carried out from the time point t24 to the time point t25. Thereafter, the depression increase and the depression return are repeated.

Comparative Example

In the comparative example using the constant value corresponding to the common use (time) limitation variation rate, target driving torque tFo0 is raised and lowered at the slightly limited variation rate with respect to the variation in accelerator opening angle APO as denoted by a dot line in FIG. 17.

In this case, the acceleration variation is large and there is a possibility of a jerky motion of the vehicle. Furthermore, in a case where the low torque side limitation variation rate is used as in a case where the demanded torque explained in FIG. 16 is large, there is a possibility of further increasing a feeling of the jerky motion.

Operation of the First Embodiment

On the other hand, in the first embodiment, the low torque side limitation variation rate calculated at step S104 in FIG. 9 is set to be a value smaller than the common use (time) limitation variation rate in a case where accelerator opening angle APO is smaller than accelerator opening angle threshold value APOlim as shown in FIG. 12.

Thus, in the first embodiment, target driving torque tFo0 is suppressed to a small variation rate than the comparative example denoted by the dot line, as denoted by the solid line in FIG. 17.

Thus, even if the depression increase of the accelerator pedal (not shown) and the depression return thereof are repeated as described above, the variation of the acceleration can be suppressed and a jerky feeling that the driver gives can be suppressed.

(A Case where the Demanded Torque During the Change from the Coasting Traveling State→Drive Traveling State is Large)

Next, the operation in a case where the demanded torque is large in a case where the change from the coasting traveling state to the drive traveling state occurs will be explained on a basis of FIG. 18.

In this operation example, the driver does not depress the accelerator pedal (not shown) from a time point t30 to a time point t31 so that accelerator opening angle APO indicates zero. In this case, target driving torque tFo0 indicates a negative value and a regeneration is carried out.

Then, from a time point t31 to a time point t33, the acceleration operation such that the driver depresses the accelerator pedal (not shown) is carried out. In addition, this acceleration operation is such that a depression quantity of the accelerator pedal is deep and the driver's demanded torque is relatively large. That is to say, such an operation that the acceleration demand is strong so that target driving torque tFo0 exceeds torque variation rate switching threshold value TrqA is carried out.

Comparative Example

Figure 18:
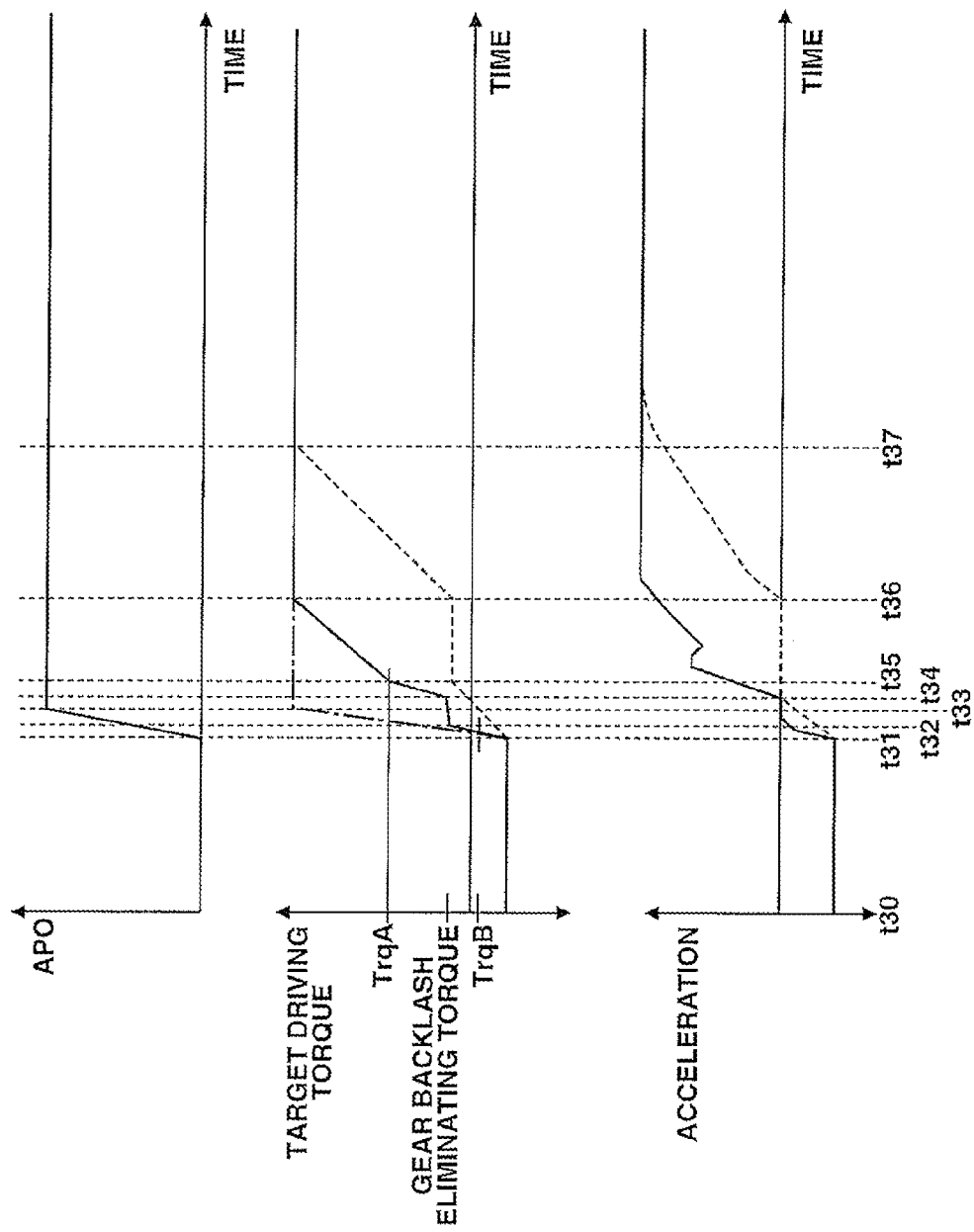
FIG. 18 is a timing chart representing an operation example between the vehicular driving torque control apparatus in the first preferred embodiment and the comparative example in a case where the demanded torque at the time of a change from a coasting traveling state to the drive traveling state is large.

In this case, in the comparative example, target driving torque tFo0 is raised with a limitation of a constant limitation variation rate corresponding to the common use (time) limitation variation rate as denoted in the dot line shown in FIG. 18, in the same way as the example shown in FIG. 16.

Then, a torque rise is suppressed by a setting time from a time point (a time point between t34 and t35 in FIG. 18) at which target driving torque tFo0 is raised to a gear backlash eliminating torque and a gear backlash eliminating torque limiting process in which the shock due to the gear backlash elimination is suppressed is executed. Thereafter, from a time point t36 at which the setting time has elapsed, target driving torque tFo0 is again raised at the constant limitation variation rate corresponding to the constant common use (time) limitation variation rate.

In the comparative example, on a basis of the above-described operation, a suppression of an acceleration shock by means of the increase variation rate limiting process and the suppression of a gear backlash elimination shock by means of a gear backlash eliminating torque limiting process are carried out.

However, in this comparative example, a time is required up to a time point of t37 in order for target driving torque tFo0 to reach to original target driving torque tFo0 in accordance with the acceleration operation and a rise in the acceleration is moderate so that the driver gives an unpleasant feeling due to a lack in the acceleration feeling.

First Embodiment

In the first embodiment, in a case where the acceleration operation as shown in FIG. 18 is carried out, the low torque side limitation variation rate is determined by means of the increase variation rate limiting process shown in the flowchart of FIG. 9.

Hence, in a depression initial stage of the accelerator pedal (not shown), the increase of target driving torque tFo0 is started at the variation rate (increase gradient) of the low torque side limitation variation rate until target driving torque tFo0 reaches to torque variation rate switching threshold value TrqA.

Thereafter, from a time point at which target driving torque tFo0 has reached to a gear backlash eliminating determination threshold value TrqB, a count of a gear backlash eliminating timer is started. Then, during a time interval at which the count value of this timer reaches to a gear backlash eliminating end determination threshold value T1, one of target driving torque tFo0 based on the low torque side limitation variation rate and the gear backlash eliminating torque which is smaller than the other is selected. This is based on the process of step S202→S203→S204→S205→S206 based on the fact that accelerator opening angle APO is ON and driving torque command value previous value>gear backlash eliminating determination threshold value TrqB in the gear backlash eliminating process shown in the flowchart of FIG. 10.

Thus, target driving torque tFo0 is limited to the gear backlash eliminating torque from time point t32 to a time point (t34) at which the count of the gear backlash eliminating timer is ended.

It should be noted that the time duration (gear backlash eliminating end determination threshold value) during which the target driving torque is limited to the gear backlash eliminating torque is dependent upon accelerator opening angle APO, is set to be smaller as accelerator opening angle APO is relatively large and is set to be smaller as the gear shift stage is high.

Hence, as shown in the example of FIG. 18, when the driver's demanded torque is large acceleration, the limitation time of the gear backlash eliminating torque is set to be relatively short.

Thereafter, from a time point (t34) at which the count of the gear backlash eliminating timer is ended, the target driving torque tFo0 is again varied with the limitation of the low torque side limitation variation rate. Then, after a time point of t35 at which target driving torque tFo0 has reached to torque variation rate switching threshold value TrqA, target driving torque tFo0 is limited to the high torque side limitation variation rate.

In the first embodiment, the time point at which target driving torque tFo0 has reached to the original target driving torque tFo0 in accordance with the acceleration operation denoted by the dot-and-dash line in FIG. 18 from the start of the acceleration operation (a time point of t31) is t36. In this way, the time duration required for target driving torque tFo0 to reach to original target driving torque tFo0 in accordance with the acceleration operation denoted by the dot-and-dash line is shortened than the case of the comparative example (a time point of t37) and accordingly the unpleasant feeling due to the insufficient acceleration feeling is difficult to be given.

In addition, in the same way as the example of FIG. 16, the limitation of target driving torque tFo0 by means of the increase variation rate limiting process is strengthened at the high torque side while this limitation is weakened at the low torque side. While the insufficient acceleration feeling is suppressed, the generation of the acceleration shock due to the twist of the drive train can be suppressed due to this variation rate limitation.

Furthermore, the time duration during which the gear backlash eliminating torque limiting process is executed (the count time of the timer) is set in accordance with accelerator opening angle APO. Thus, the execution time of the gear backlash eliminating torque limiting process is made shorter than the case of the comparative example.

This more enlightens the insufficient feeling of acceleration that the driver gives.

Then, in a case where accelerator opening angle APO is large, the vehicular acceleration is accordingly large. Hence, the shock due to the gear backlash elimination is difficult to be felt by the driver as compared with the case where accelerator opening angle APO is relatively small and the vehicular acceleration is low. Hence, since the timer count time is shortened as described above, the gear backlash eliminating shock becomes large as compared with the case where the timer count time is long but a shock feeling given to the driver can be suppressed. Hence, a compatibility between the improvement of the acceleration feeling and the suppression of the shock can be achieved.

(A Case where the Demanded Torque is Small at a Time of the Change from Coasting Traveling State→Drive Traveling State Occurs)

Next, an operation in a case where the demanded torque is small in a case where the traveling state is changed from the coasting traveling state to the drive traveling state will be described on a basis of FIG. 19.

In this operation example, the driver does not depress the accelerator pedal (not shown) from a time point t40 to a time point t41 so that accelerator opening angle APO indicates 0. In addition, target driving torque tFo0 is a negative value and the regeneration is carried out.

Then, from a time point t41 to a time point t42, the driver carries out the acceleration operation by depressing the accelerator pedal (not shown). This acceleration operation is such that the accelerator pedal depression quantity is shallower than the example of FIG. 18 and the driver's demanded torque is relatively small. That is to say, the acceleration operation in which target driving torque tFo0 does not reach to torque variation rate switching threshold value TrqA is carried out.

First Embodiment

Figure 19:
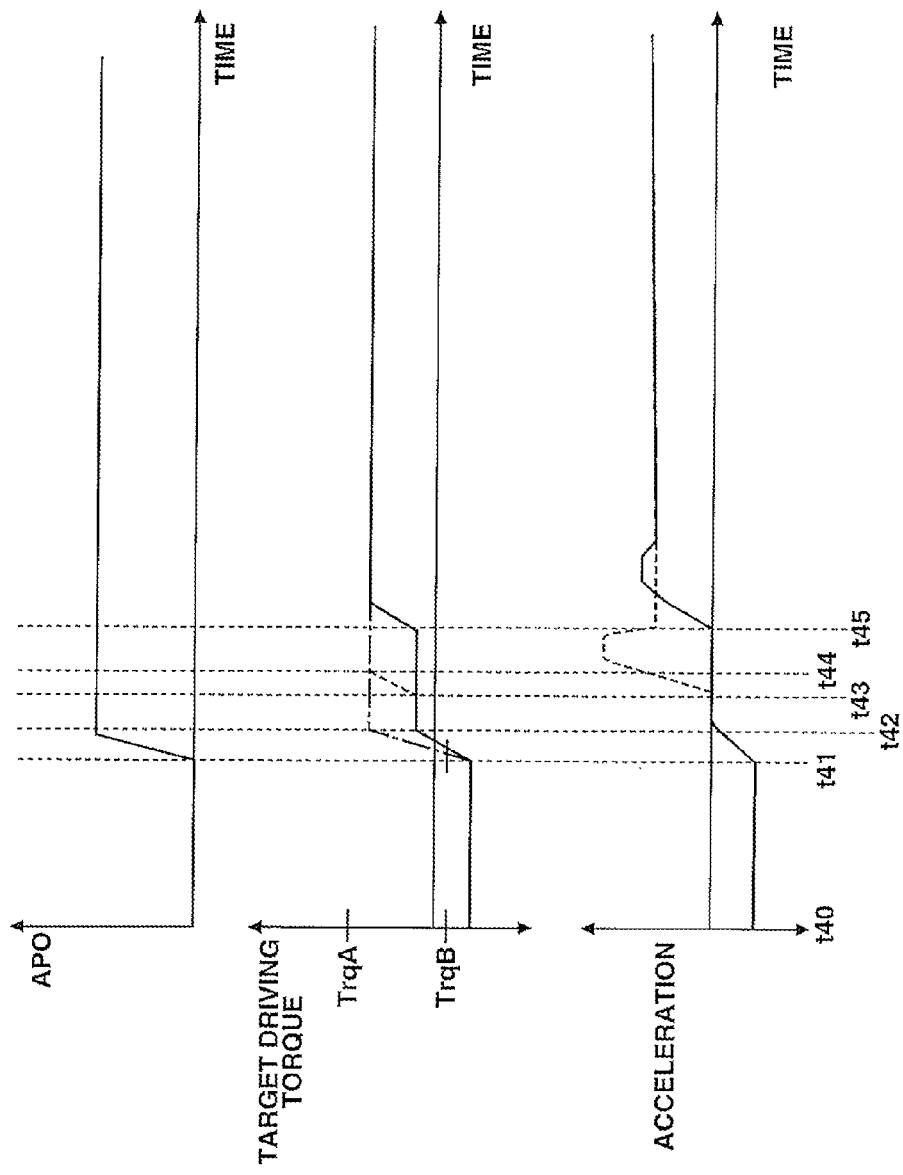
FIG. 19 is a timing chart representing an operation example between the vehicular driving torque control apparatus in the first preferred embodiment and the comparative example in a case where the demanded torque at the time of the change from the coasting traveling state to the drive traveling state is small.

In a case where the acceleration operation shown in FIG. 19 is carried out, in the first embodiment, the low torque side limitation variation rate is determined according to the increase variation rate limiting process shown in the flowchart of FIG. 9.

Hence, at the initial stage of the depression of the accelerator pedal (not shown), the increase of target driving torque tFo0 is started at the low torque side limitation variation rate.

Thereafter, the count of the gear backlash eliminating timer is started from the time point at which target driving torque tFo0 has reached to gear backlash eliminating determination threshold value TrqB. Then, during the time interval at which the count of this timer has reached to a gear backlash eliminating end determination threshold value T1, one of target driving torque tFo0 based on the low torque side limitation variation rate and the gear backlash eliminating torque which is smaller than the other is selected as target driving torque tFo0. This is based on the process of step S202→S203→step S204→step S205→step S206 based on the fact that accelerator opening angle APO is ON and the driving torque command value (previous value)>gear backlash eliminating determination threshold value TrqB in the gear backlash eliminating process shown in the flowchart of FIG. 10.

Therefore, target driving torque tFo0 is limited to the gear backlash eliminating torque from time point t42 to a time point (t45) at which the count of the gear backlash eliminating timer is finished.

In this way, in a case where the depression depth of the accelerator pedal (not shown) is shallow and the demanded torque is small, the count time of the timer is set to be long as compared with the case where accelerator opening angle APO is large on a basis of a gear backlash eliminating end determination time map shown in FIG. 14.

Hence, the count of the gear backlash eliminating timer is ended at a time point t45 which is later than the example shown in FIG. 18 and, from this time point t45, target driving torque tFo0 is again limited by the low torque side limitation variation rate and is raised.

In this way, in a case where accelerator opening angle APO is small or the demanded torque is small, the vehicular acceleration is low so that the gear backlash eliminating shock is remarkable.

Thus, in the first embodiment, in a case where accelerator opening angle APO is small, a gear backlash eliminating time is set to be long so that the driver cannot feel a gear backlash eliminating shock.

The comparative example denoted by the dot line in FIG. 19 shows an example in which the gear backlash eliminating time is set to the same gear backlash eliminating time as the case where accelerator opening angle APO is large as shown in FIG. 18. In this way, in a case where the gear backlash eliminating time is set to be short, a shock (acceleration variation) due to the gear backlash elimination is developed so that the driver feels the gear backlash elimination shock.

In the first embodiment, as shown in FIG. 14, in a case where accelerator opening angle APO is small, the gear backlash eliminating time is set to be long so that the driver does not feel the gear backlash elimination shock.

Effect of the First Embodiment

Effects of the first embodiment will be listed below. 1) There is provided with the vehicular driving torque control apparatus in the first embodiment, in a hybrid vehicle including an engine Eng and a motor generator MG as power sources, an EV traveling mode in which the vehicle is driven only through the power of motor generator MG and an HEV traveling mode in which the vehicle is driven through both powers from engine Eng and motor generator MG, both modes being selectable, a driving force being determined on a basis of an information in accordance with a demanded load by a driver, and a mode switching being carried out between the EV traveling mode and the HEV traveling mode, the vehicular driving torque control apparatus comprising: an integrated controller 10 as a driving torque control section configured to control the driving torque of the power sources in accordance with a target driving torque tFo0 obtained on a basis of accelerator opening angle APO operated by the driver; a variation rate limiting section (a part executing the process shown in the flowchart of FIG. 9) included in integrated controller 10 and configured to execute an increase variation rate limiting process in which a variation rate at an increase side is limited so as not to exceed a preset limitation variation rate when target driving torque tFo0 is increased; and a limitation variation rate setting section (a part executing the process of steps S103 and S104 in the flowchart of FIG. 9) included in integrated controller 10 and configured to set, as limitation variation rates, a low torque side limitation used at the low torque side until target driving torque tFo0 reaches to preset torque variation rate switching threshold value TrqA and a high torque side limitation variation rate used in the high torque side exceeding torque variation rate switching threshold value TrqA and execute a limitation suppression variation rate setting process in which the low torque side limitation variation rate is set to be larger than the high torque side limitation variation rate until the driving torque command value as target driving torque tFo0 reaches to torque variation rate switching threshold value TrqA.

In a low torque region in which target driving torque tFo0 reaches to the preset torque variation rate switching threshold value TrqA, the twist of the drive train is difficult to be generated. In this low torque region, the increase variation rate of the driving torque is set to be high so that the improvement in an acceleration response characteristic can be made.

On the other hand, in a high torque region in which target driving torque tFo0 exceeds the preset torque variation rate switching threshold value TrqA, the twist of the drive system is easy to be generated as compared with the low torque region. Thus, in the high torque region, the increase variation rate of the driving torque is suppressed so that the acceleration shock due to the twist of the drive train can be reduced.

As described above, in the first embodiment, it becomes possible to increase the vehicular acceleration response characteristic than the conventional one (conventional driving torque control apparatus) while the acceleration shock is suppressed.

Especially, a control response characteristic of the vehicle in which motor generator MG is equipped is higher than the vehicle in which the power source is engine Eng. In addition, in the hybrid vehicle, a motor torque distribution is increased and the control response characteristic is high, in the low torque region. Therefore, the control response characteristic is high as compared with the vehicle in which only engine Eng is the power source and the above-described suppression effect of the acceleration shock according to the limitation suppression variation rate setting process is high, and a controllability of securing the acceleration response characteristic according to the high driving torque control accuracy is superior.

2) There is provided with the vehicular driving torque control apparatus in the first embodiment, wherein the limitation variation rate setting section (a part in which the process at step S104 of the flowchart of FIG. 9 is executed) executes the limitation suppression variation rate setting process in a case where accelerator opening angle APO is larger than preset accelerator opening angle threshold value APOlim and sets the low torque side limitation variation rate to be equal to or below the high torque side limitation variation rate in a case where accelerator opening angle APO is smaller than accelerator opening angle threshold value APOlim (refer to FIG. 12). In a case where the depression quantity of the accelerator pedal (not shown) is shallow, namely, in a case where accelerator opening angle APO is smaller than accelerator opening angle threshold value APOlim, an acceleration intention of the driver is small. If, in such a small acceleration intention as described above, the limitation suppression variation rate setting process is executed to set the low torque side limitation variation rate to be large, a sensitive driving torque variation with respect to an accelerator pedal manipulation occurs, the vehicle makes a jerky motion, and there is a possibility of giving an unpleasant feeling to the driver.

Therefore, in the first embodiment, in a case where accelerator opening angle APO is smaller than accelerator opening angle threshold value APOlim and the acceleration intention of the driver is small, the low torque side limitation variation rate is set to be equal to or below the high torque side limitation variation rate without execution of the limitation suppression variation rate setting process. Thus, in spite of the small acceleration intention of the driver, the first embodiment can suppress the low torque side limitation variation rate which is set to be large so that a sensitive driving torque variation with respect to the accelerator pedal manipulation occurs, the vehicle makes the jerky motion, and the driver gives the unpleasant feeling.

It should be noted that, in a case where the acceleration intention of the driver is large, the limitation suppression variation rate setting process is executed. As described in item 1), it becomes possible to increase the vehicular acceleration characteristic more than the conventional one while the acceleration shock is suppressed.

3) There is provided with the vehicular driving torque control apparatus in the first embodiment, wherein the torque variation rate switching threshold value (TrqA) is set in accordance with a gear stage of automatic transmission AT and set to be larger as a higher gear stage of the automatic transmission. During the acceleration, as the gear stage is higher gear stage, a large acceleration is needed to obtain the acceleration feeling.

Thus, as the gear stage is higher gear stage, the low torque side limitation variation rate is maintained until the high torque. Consequently, the high acceleration response characteristic is maintained and a sense of acceleration can assuredly be obtained.

4) There is provided with the vehicular driving torque control apparatus in the first embodiment, wherein the low torque side limitation variation rate is set to be larger as the vehicle speed VSP is higher.

As the vehicle speed becomes higher, the low torque side limitation variation rate is set to be larger. As the vehicle speed becomes higher, the torque increase rate is increased to the torque variation rate switching threshold value (TrqA) so that a more sense of acceleration can be obtained.

That is to say, as the vehicle speed becomes higher, the depression quantity of the accelerator pedal is required to be large and the higher torque is needed. Thus, as the vehicle speed becomes higher, until the higher torque, the torque is maintained at the low torque side limitation variation rate. Thus, it becomes possible to increase the sense of acceleration.

5) There is provided with the vehicular driving torque control apparatus in the first embodiment, wherein integrated controller 10 as the driving torque control section comprises a gear backlash eliminating torque limitation control section (a part executing the flowchart in FIG. 10) which limits the input torque of automatic transmission AT to the gear backlash eliminating torque set to be smaller than target driving torque tFo0 but larger than 0 torque, during a time interval during which a measurement end of gear backlash eliminating end determination threshold T1 which is preset gear backlash eliminating time required for a driving force transmission system of a drive wheel side from automatic transmission AT to be switched from a negative drive state to a positive drive state when target driving torque tFo0 is switched from the negative torque to the positive torque and this torque limitation control section sets gear backlash eliminating end threshold value T1 as the gear backlash eliminating time to be shorter as accelerator opening angle APO is larger.

When target driving torque tFo0 is switched from the negative torque to the positive torque, a shock due to a backlash of the gear in the drive transmission system is generated. The shock due to the gear backlash can be reduced by performing the gear backlash elimination by a smaller driving torque. However, when the driving torque at the time of the gear backlash eliminating process is made small, a time required for the gear backlash elimination becomes long so that the acceleration response characteristic is reduced.

In addition, the shock due to the gear backlash is easy to perceive for the driver when the vehicular acceleration is low and the driver's demanded torque is small. However, when the vehicular acceleration is high and the driver's demanded torque is large, a variation of the acceleration of the vehicle itself is large so that the shock is difficult to perceive.

Therefore, the torque limitation control section sets the gear backlash eliminating end determination threshold value T1 as the gear backlash eliminating time to be shorter as accelerator opening angle APO becomes larger. Thus, in a case where the driver's demanded torque is large, namely, the acceleration demand is high, the gear backlash eliminating time is shortened and the acceleration response characteristic can be increased. In addition, at this time, the gear backlash eliminating shock is difficult to be perceived by the driver.

On the other hand, the torque limitation control section sets gear backlash eliminating end determination threshold value T1 as the gear backlash eliminating time to be long in a case where accelerator opening angle APO is small. Thus, the gear backlash eliminating shock can be difficult to be perceived by the driver.

In this case, since accelerator opening angle APO is small and the driver's demanded torque is small, the driver is difficult to give the unpleasant feeling due to an acceleration response delay.

In this way, in the first embodiment, it becomes possible to have the compatibility between the suppression of the gear backlash eliminating shock and the improvement in the acceleration response characteristic during the gear backlash elimination.

6) There is provided with the vehicular driving torque control apparatus in the first embodiment, wherein integrated controller 10 comprises a variation rate limitation section configured to execute the increase variation rate limiting process shown in the flowchart of FIG. 9 and a gear backlash eliminating torque limitation control section configured to execute the gear backlash eliminating torque limiting process shown in the flowchart of FIG. 10, integrated controller 10 as the driving torque control section selects one of the values of target driving torque tFo0 set by the variation rate limiting section and of the gear backlash eliminating torque set by the gear backlash eliminating torque limitation control section which is smaller than the other as target driving torque tFo0 (step S206).

Thus, during the transition from the coasting traveling state to the drive traveling state, the acceleration shock and the gear backlash eliminating shock can be suppressed.

Other Preferred Embodiments

Next, the vehicular driving torque control apparatus in other preferred embodiments will be described.

It should be noted that the other preferred embodiments are modifications of the first embodiment and, therefore, for the structure common to the first embodiment, the same signs as those in the first embodiment are attached and their explanations will be omitted and only the difference points from the first embodiment will be explained.

Second Preferred Embodiment

In the second preferred embodiment, the characteristic of the low torque side limitation variation rate in the torque limiting process is determined according to an accelerator opening angle variation rate (quantity) ΔAPO.

That is to say, in the first embodiment, the low torque side limitation variation rate is set to be larger than the common use (time) limitation variation rate or to be equal to or below the common use (time) limitation variation rate is set on a basis of accelerator opening angle APO as shown in FIG. 12. Whereas, in the second embodiment, a magnitude of the low torque side limitation variation rate is set on a basis of accelerator opening angle variation rate (quantity) ΔAPO.

Figure 20:
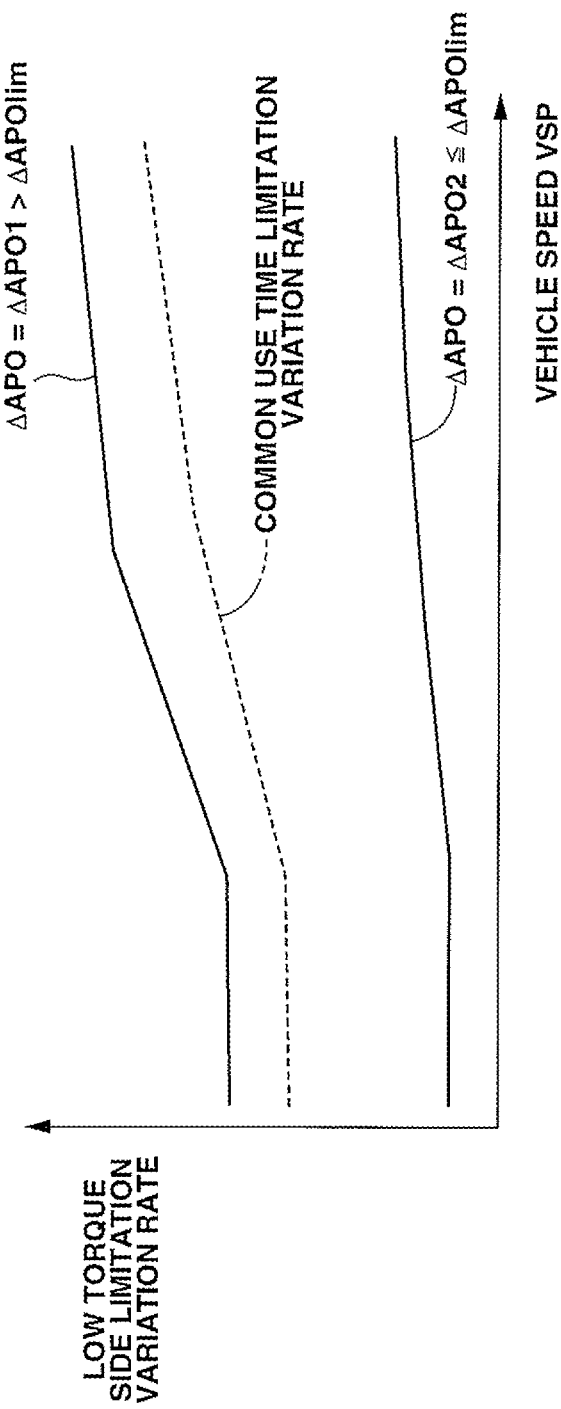
FIG. 20 is a variation rate limitation value map used for the calculation of a low torque side limitation variation rate in the increase variation rate limiting process of the vehicular driving torque control apparatus in a second preferred embodiment.

Specifically, in a case where accelerator opening angle variation rate (quantity) ΔAPO per unit time exceeds ΔAPO1 shown in FIG. 20 which is larger than a variation quantity threshold value ΔAPOlim to determine that the acceleration demand is high, the low torque side limitation variation rate is set to be higher than the high torque side variation rate (common use (time) limitation variation rate).

On the other hand, in a case where accelerator opening angle variation rate per unit time ΔAPO is equal to or below ΔAPO2 which is equal to or below variation quantity threshold value ΔAPOlim, the low torque side limitation variation rate is set to be lower than the high torque side limitation variation rate (common use (time) limitation variation rate). It should be noted that, in this case, the low torque side limitation variation rate may be set to be equal to the high torque side variation rate (the common use (time) limitation variation rate).

In addition, in the second embodiment, when accelerator opening angle APO is operated toward the decrease side and the deviation of target driving torque tFo0 is turned to a non-increase side, the torque limiting process is ended. Then, when, during the increase variation rate limiting process, the driving torque command value is equal to or larger than torque variation rate switching threshold value TrqA, the driving torque is limited by the common use (time) limitation variation rate.

Hence, in the second embodiment, in a case where accelerator opening angle variation rate (quantity) ΔAPO is relatively large, namely, in a case where a depression speed of the driver on the accelerator pedal is high and the acceleration demand is high, the operation is as follows.

In this case, since the low torque side limitation variation rate is set to be larger than the common use (time) limitation variation rate, the acceleration response characteristic can be secured. Then, since, during the acceleration time, the driver is, due to the acceleration, difficult to perceive the shock caused by the twist of the drive train, the driver is difficult to perceive the acceleration shock even if the low torque side limitation variation rate is set to be large.

On the other hand, in a case where accelerator opening angle variation rate (quantity) ΔAPO is small and the acceleration demand is low, the low torque side limitation variation rate is set to be lower than the common use (time) limitation variation rate. This can suppress the jerky motion of the vehicle in a case where the driver repeats on-and-off operations of small accelerator opening angle APO as shown in FIG. 17 in the first embodiment.

2-1) There is provided with the vehicular driving torque control apparatus in the second embodiment, wherein, in integrated controller 10, the limitation variation rate setting section (a part which executes the process of step S104 of the flowchart shown in FIG. 9) executes the limitation suppression variation rate setting process in a case where accelerator opening angle variation rate (quantity) ΔAPO is larger than preset variation quantity threshold value (ΔAPOlim) and sets the low torque side limitation variation rate to be equal to or below the high torque side limitation variation rate in a case where accelerator opening angle variation rate (quantity) ΔAPO is equal to or below variation quantity threshold value ΔAPOlim.

In a case where the depression variation quantity of the accelerator pedal (not shown) is small, namely, in a case where accelerator opening angle variation quantity ΔAPO is smaller than variation quantity threshold value ΔAPOlim, the acceleration intention of the driver is small. In such a case where such an accelerator intention as described above is small, the low torque side limitation variation rate is set to be large by executing the limitation suppression variation rate setting process. At this time, the sensitive driving torque variation occurs with respect to the accelerator pedal manipulation, the vehicle makes a jerky motion, and there is a possibility of giving an unpleasant feeling to the driver.

Therefore, in the second embodiment, in a case where accelerator opening angle variation rate (quantity) ΔAPO is smaller than variation quantity threshold value ΔAPOlim and the acceleration intention of the driver is small, the low torque side limitation variation rate is set to be equal to or below the high torque side limitation variation rate without execution of limitation suppression variation rate setting process. Thus, in spite of the fact that the acceleration intention of the driver is small, such a disadvantage that the low torque side limitation variation rate is set to be large, the sensitive driving torque variation with respect to the accelerator pedal manipulation occurs, the vehicle makes the jerky motion, and the driver gives the unpleasant feeling can be suppressed.

It should be noted that, in a case where accelerator opening angle variation rate (quantity) ΔAPO is larger than variation quantity threshold value ΔAPOlim and the acceleration intention of the driver is large, the limitation suppression variation rate setting process is executed. Thus, as described in above item 1), while the acceleration shock is suppressed, the acceleration response characteristic of the vehicle can more be increased than the conventional one.

Third Preferred Embodiment

In a third preferred embodiment, the characteristic of the low torque side limitation variation rate in the increase variation rate limiting process is determined according to target driving torque tFo0.

Figure 21:
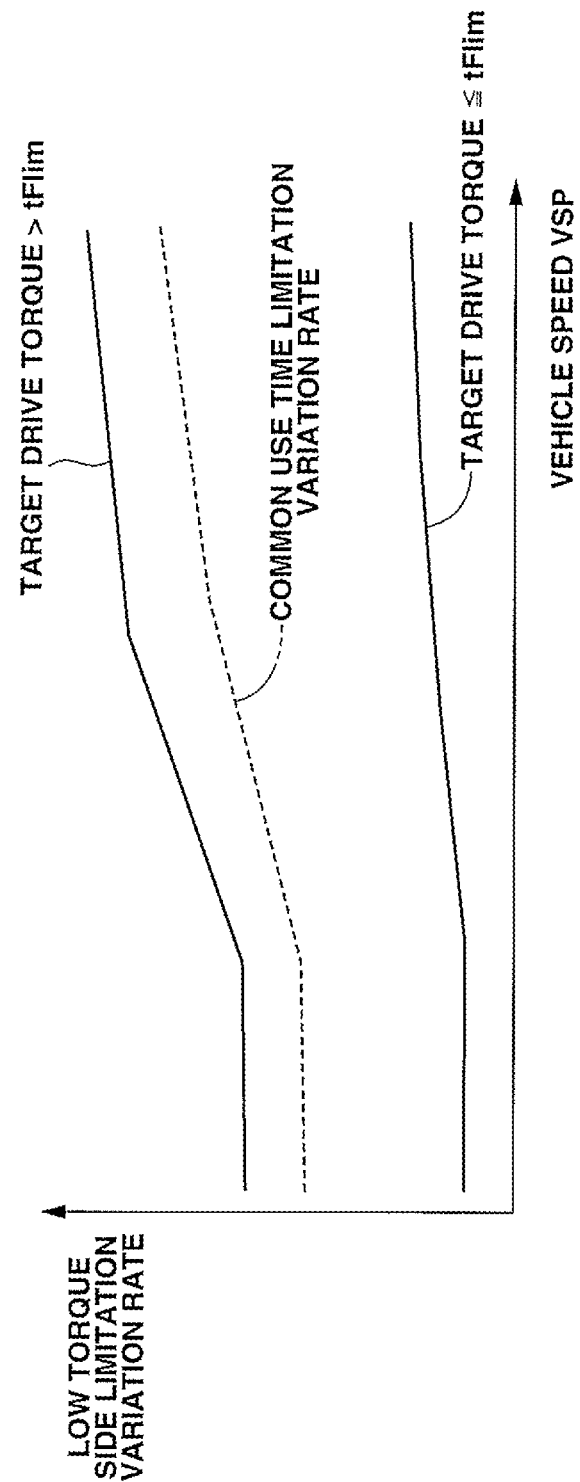
FIG. 21 is a variation rate limitation value map used for the calculation of the low torque side limitation variation rate in the increase variation rate limiting process of the vehicular driving torque control apparatus in a third preferred embodiment.

That is to say, in the first embodiment, whether the low torque side limitation variation rate is set to be larger than the common use (time) limitation variation rate or set to be equal to or below the common use (time) limitation variation rate is set on a basis of accelerator opening angle APO as shown in FIG. 12. Whereas, in the third embodiment, a magnitude of the low torque side limitation variation rate is set on a basis of target driving torque tFo0, as shown in FIG. 21.

Specifically, in a case where target driving torque tFo0 is in excess of a target driving torque threshold value tFlim at which the driver demanded torque obtains the acceleration to some degree, the low torque side limitation variation rate is set to be larger than the high torque side variation rate (common use (time) limitation variation rate).

On the other hand, in a case where target driving torque tFo0 is equal to or below target torque threshold value tFlim, the low torque side limitation variation rate is set to be lower than the high torque side variation rate (common use (time) limitation variation rate). It should be noted that, in this case, the low torque side limitation variation rate may be set to be equal to the high torque side limitation variation rate (common use (time) limitation variation rate).

In the third embodiment, in the same way as the first embodiment, when accelerator opening angle APO is operated toward the decrease side and the deviation of target driving torque tFo0 is in the increase side, the increase variation rate limiting process is ended. In addition, when the driving torque command value is equal to or larger than torque variation rate switching threshold value TrqA during the torque limiting process, the driving torque limitation value is limited by the common use (time) limitation variation rate.

Hence, in the third embodiment, in a case where target driving torque tFo0 is relatively large, namely, in a case where depression quantity of the driver on the accelerator pedal (not shown) is large and the acceleration demand is high, the following operation is observed.

In this case, the low torque side limitation variation rate is made large so that the acceleration response characteristic can be secured. In addition, at the time of this acceleration, the driver is difficult to perceive the shock caused by the twist of the drive train through the acceleration.

In addition, in a case where target driving torque tFo0 is small, the low torque side limitation variation rate is set to be lower than common use (time) limitation variation rate. Thus, as described in FIG. 17 in the first embodiment, in a case where the driver repeats short and quick on-and-off operation of accelerator opening angle APO, such a disadvantage that the vehicle makes the jerky motion can be suppressed.

3-1) There is provided with the vehicular driving torque control apparatus in the third embodiment, wherein the limitation variation rate setting section (a part in which the process of step S104 of the flowchart in FIG. 9 is executed) in integrated controller 10 executes the limitation suppression variation rate setting process in a case where target driving torque tFo0 is larger than preset target driving torque threshold value tFlim and sets the low torque side limitation variation rate to be equal to or below the high torque side limitation variation rate in a case where target driving torque tFo0 is equal to or below target driving torque threshold value tFlim.

In a case where the depression quantity of the accelerator pedal (not shown) is shallow and target driving torque tFo0 is small, namely, target driving torque tFo0 is equal to or smaller than target driving torque threshold value tFlim, the acceleration intention of the driver is small. In such a case of the small acceleration intention, the limitation suppression variation rate setting process is executed to set the low torque side limitation variation rate to be large. At this time, such a disadvantage occurs that the sensitive driving torque variation with respect to the accelerator pedal manipulation occurs, the vehicle makes the jerky motion, and there is a possibility of giving the unpleasant feeling to the driver.

To avoid this disadvantage, in the third embodiment, in a case where target driving torque tFo0 is equal to or below target driving torque threshold value tFlim and the acceleration intention of the driver is small, the low torque side limitation variation rate is set to be equal to or below the high torque side limitation variation rate without execution of the limitation suppression variation rate setting process. Thus, in spite of the fact that the acceleration intention of the driver is small, such a disadvantage that the low torque side limitation variation rate is set to be large, the sensitive driving torque variation occurs with respect to the accelerator pedal manipulation, the vehicle makes the jerky motion, and the driver gives the unpleasant feeling can be suppressed.

In addition, in a case where target driving torque tFo0 is larger than target driving torque threshold value tFlim and the acceleration intention of the driver is large, the limitation suppression variation rate setting process is executed. Thus, as described in above item 1), while the acceleration shock is suppressed and the acceleration response characteristic can more be increased than the conventional one.

As described hereinabove, the vehicular driving torque control apparatus according to the present invention has been explained on a basis of the preferred embodiments. However, the present invention is not limited to the preferred embodiments for the specific structure. Design modifications and addition of the designs may be allowed without departing from a gist of the invention defined in each of the claims.

For example, in each of the preferred embodiments, the vehicular driving torque control apparatus according to the present invention is applied to the hybrid vehicle of a rear (road) wheel drive. However, the vehicular driving torque control apparatus is applicable to another vehicle other than the hybrid vehicle in which the power source is only the engine or only the motor. In addition, the present invention is applicable to a front (road) wheel drive, four (road) wheel drive vehicle, or whole wheel drive vehicle.

In addition, in the first embodiment, the torque variation rate switching threshold value is set in accordance with the gear ratio and is set to be larger as the gear ratio becomes higher. However, the present invention is not limited to this.

Figure 22:
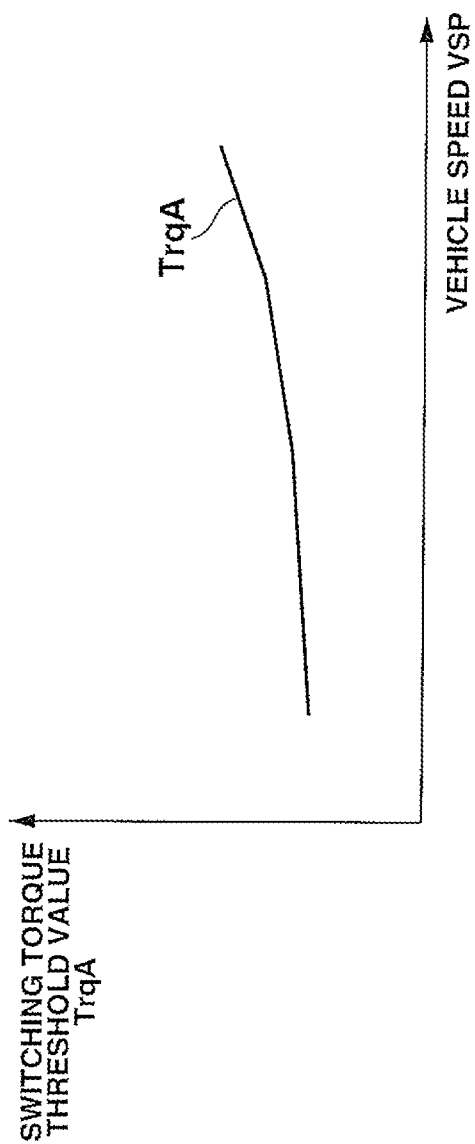
FIG. 22 is a torque variation rate switching threshold value map representing one example of a torque variation rate switching threshold value characteristic which switches between a higher torque side limitation variation rate and a lower torque side limitation variation rate in a increase variation rate limiting process of the vehicular driving torque control apparatus according to the present invention and representing an example of setting the torque variation rate switching threshold value in accordance with a vehicle speed VSP.

For example, torque variation rate switching threshold value TrqA may be set to a larger value as vehicle speed VSP becomes higher as shown in FIG. 22. That is to say, as the vehicle speed becomes higher, an acceleration that feels the sense of acceleration becomes larger. Therefore, as the vehicle speed is higher, the low torque side limitation variation rate is maintained until the high torque so that the acceleration response characteristic can highly be maintained, and a higher acceleration feeling can be obtained.

In addition, in the preferred embodiments, the low torque side limitation variation rate is, as shown in FIG. 12, in accordance with vehicle speed VSP, namely, as the vehicle speed becomes higher, the low torque side limitation variation rate becomes larger. However, the present invention is not limited to this.

Figure 23:
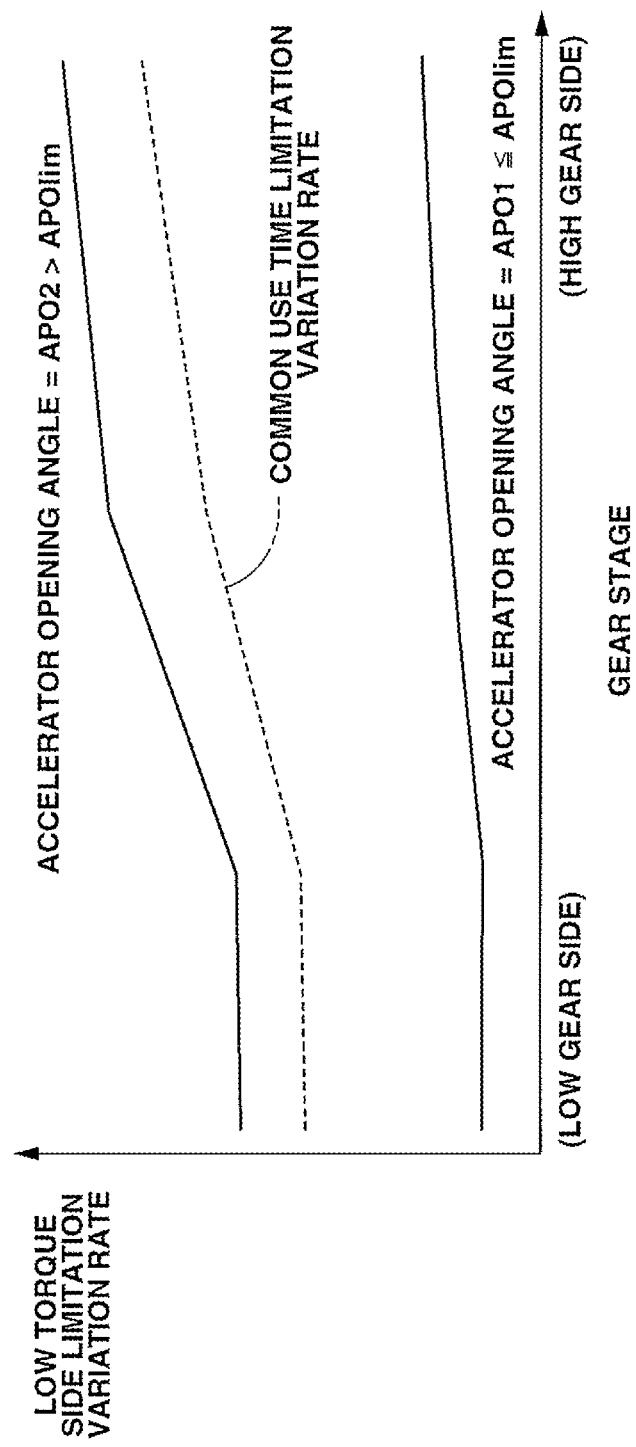
FIG. 23 is an example of a variation rate limitation value map used for the calculation of the low torque side limitation variation rate in the increase variation rate limiting process of the vehicular driving torque control apparatus according to the present invention and representing an example of setting the low torque side limitation variation rate in accordance with a gear stage.

For example, as shown in FIG. 23, the low torque side limitation variation rate may be in accordance with the gear stage, namely, as the gear stage becomes higher, the low torque side limitation variation rate may be larger. That is to say, since, during the acceleration, the torque that provides the acceleration at which the driver feels that the acceleration is carried out becomes larger as the gear stage becomes higher, the low torque side limitation variation rate becomes larger as the gear stage becomes higher. Thus, at the high gear stage, the acceleration response characteristic during the depression of the accelerator pedal can be improved.

In addition, as compared with the case where the low torque side limitation variation rate is set to be large in the same way as at the lower gear stage, the acceleration shock can be reduced.

Figure 24:
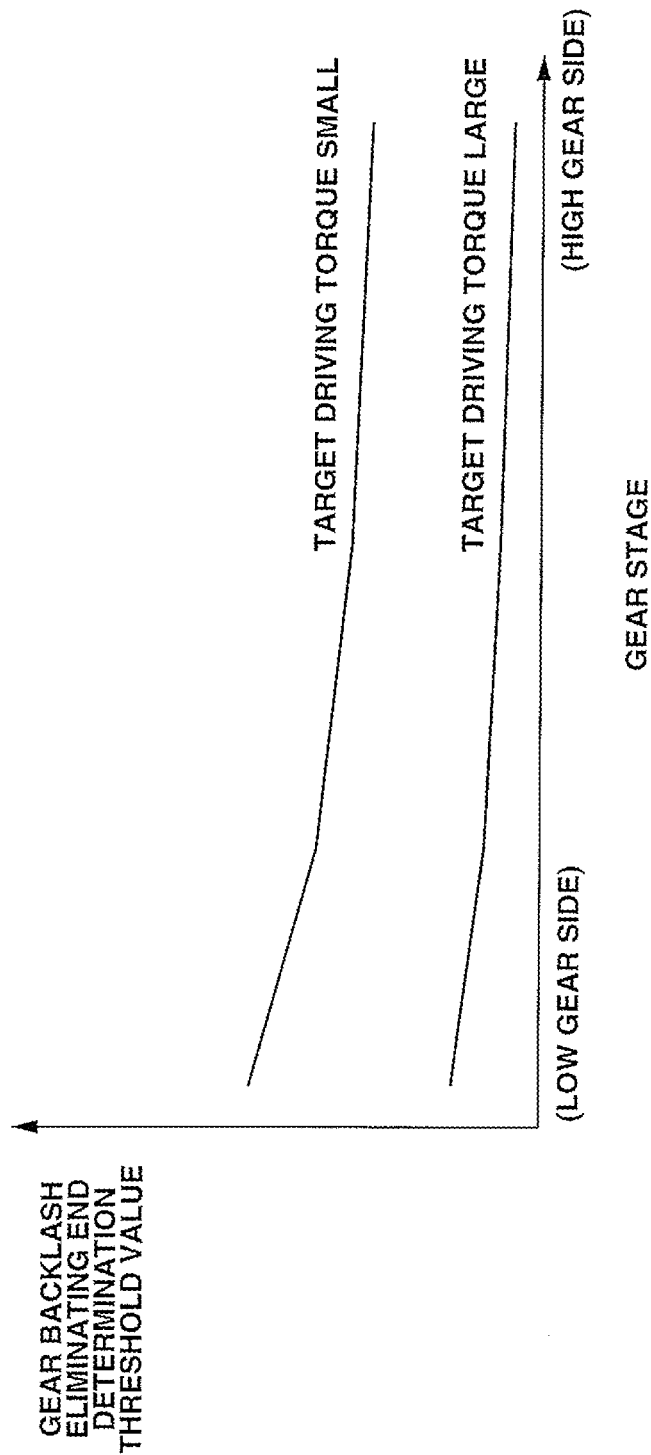
FIG. 24 is an example of a gear backlash eliminating end determination threshold value map used for the calculation in a gear backlash eliminating torque control in the backlash eliminating torque control in the vehicular driving torque control apparatus according to the present invention and represents an example of setting a gear backlash eliminating time in accordance with the target driving torque.

In the vehicular driving torque control apparatus in the first embodiment, as shown in FIG. 14, gear backlash eliminating end determination threshold value T1 as the gear backlash eliminating time is varied in accordance with accelerator opening angle value APO, namely, as accelerator opening angle value APO becomes larger, gear backlash eliminating end determination threshold value T1 is set to be shorter. However, the present invention is not limited to this. That is to say, as shown in FIG. 24, the gear backlash eliminating time is varied in accordance with target driving torque tFo0, namely, as target driving torque tFo0 becomes larger, the gear backlash eliminating time may be set to be shorter. In this way, the torque limitation control section sets the gear backlash eliminating end threshold value T1 as the gear backlash eliminating time to be varied in accordance with the target driving torque, namely, as target driving torque tFo0 becomes larger, gear backlash eliminating end determination threshold value T1 is set to be shorter. Thus, in a case where the driver's demanded torque, namely, the acceleration demand is high, the gear backlash eliminating time is made shorter.

Thus, the acceleration response characteristic can be increased. In addition, in a case where the acceleration is high (large), the driver is difficult to perceive the acceleration shock.

Hence, even if the gear backlash time is shortened, the shock can be suppressed.

On the other hand, the torque limitation control section sets gear backlash eliminating end determination threshold value T1 as the gear backlash eliminating time to be longer as target driving torque tFo0 is smaller.

In this way, in a case where the acceleration of the vehicle is small, the driver is easy to feel the acceleration shock. However, in this case, the gear backlash eliminating time is set to be long so that the driver can be difficult to feel the gear backlash eliminating shock.

In addition, since, in this case, the target driving torque is small, the driver is difficult to give the unpleasant feeling due to an acceleration response delay.

Thus, this can establish the compatibility between the suppression of the gear backlash eliminating shock and the improvement in the acceleration response characteristic during the gear backlash eliminating.

CROSS REFERENCE TO THE RELATED APPLICATION

The present application has a right of priority based on a Japanese Patent Application No. 2012-271244 filed in a Japanese Patent Office on Dec. 12, 2012 and a whole disclosure of this Japanese Patent Application is herein incorporated by reference.

The invention claimed is:

1. A vehicular driving torque control apparatus, comprising:
a vehicular power source; and
a controller configured to:

control a driving torque of the vehicular power source in accordance with a target driving torque in a traveling state;

execute an increase variation rate limiting process in which a variation rate of the target driving torque at a time of an increase in the target driving torque is limited not to exceed a limitation variation rate;

set, in a form of the limitation variation rate, a low torque side limitation variation rate used in a low torque side until the target driving torque reaches a torque variation rate switching threshold value and a high torque side limitation variation rate used in a high torque side exceeding the torque variation rate switching threshold value; and execute a limitation suppression variation rate setting process in which the low torque side limitation variation rate is set to be larger than the high torque side limitation variation rate until the target driving torque reaches the torque variation rate switching threshold value.

2. The vehicular driving torque control apparatus as claimed in claim 1, wherein, when an accelerator opening angle is larger than a preset accelerator opening angle threshold value, the controller is configured to set the low torque side limitation variation rate at a larger value than the value of the low torque side limitation variation rate that is set when the accelerator opening angle is smaller than the accelerator opening angle threshold value.

3. The vehicular driving torque control apparatus as claimed in claim 1, wherein the torque variation rate switching threshold value is set in accordance with at least one of a gear ratio of a transmission or a vehicle speed and the torque variation rate switching threshold value is set to be larger as a gear shift stage becomes higher or as a vehicle speed becomes higher a higher.

4. The vehicular driving torque control apparatus as claimed in claim 1, wherein the low torque side limitation variation rate is set in accordance with at least one of a gear ratio of a transmission or a vehicle speed and the low torque side limitation variation rate is set to be larger as a gear shift stage becomes higher or as a vehicle speed becomes higher.

5. The vehicular driving torque control apparatus as claimed in claim 1, wherein, when an accelerator opening angle variation quantity is larger than a preset variation quantity threshold value, the controller is configured to set the low torque side limitation variation rate at a larger value than the low torque side limitation variation rate that is set when the accelerator opening angle variation quantity is smaller than the variation quantity threshold value.

6. The vehicular driving torque control apparatus as claimed in claim 1, wherein, when the target driving torque is larger than a preset target driving torque threshold value, the controller is configured to set the low torque side limitation variation rate at a larger value than the low torque side limitation variation rate that is set when the target driving torque is smaller than the target driving torque threshold value on a basis of the limitation suppression variation rate setting process.

7. The vehicular driving torque control apparatus as claimed in claim 1, wherein the controller is further configured to execute a gear backlash eliminating torque limitation process in which an input torque to a transmission is limited to a gear backlash eliminating torque, wherein, when the target driving torque is switched from a negative torque to a positive torque, the controller is configured to set the gear backlash eliminating torque to be smaller than the target driving torque but larger than zero torque until a measurement end of a preset gear backlash eliminating time that is required to switch a driving force transmission system of a driving wheel side of the transmission from a negative drive state to a positive drive state, wherein the controller is configured to set the preset gear backlash eliminating time to be varied in accordance with either one of the accelerator opening angle or the target driving torque, and wherein the controller is configured to set the preset gear backlash eliminating time to be shorter as either one of the accelerator opening angle or the target driving torque becomes larger.

8. The vehicular driving torque control apparatus as claimed in claim 1, wherein the controller is further configured to execute a gear backlash eliminating torque limitation process in which an input torque is limited to a gear backlash eliminating torque, wherein, when the target driving torque is switched from a negative torque to a positive torque, the controller is configured to set the gear backlash eliminating torque to be smaller than the target driving torque but larger than zero torque until a measurement end of a preset gear backlash eliminating time that is required to switch a driving force transmission system of a driving wheel side of the transmission from a negative drive state to a positive drive state, and wherein the controller is configured to set the target driving torque from one of values of the target driving torque set by the controller and the gear backlash eliminating torque set by the controller which is smaller than the other to be the target driving torque.

9. A vehicular driving torque control method, comprising:

controlling, with a controller, a driving torque of a vehicular power source in accordance with a target driving torque in a traveling state;

executing, with the controller, an increase variation rate limiting process in which a variation rate of the target driving torque at a time of an increase in the target driving torque is limited not to exceed a limitation variation rate;

setting, with the controller, in a form of the limitation variation rate, a low torque side limitation variation rate used in a low torque side until the target driving torque reaches to a torque variation rate switching threshold value and a high torque side limitation variation rate used in a high torque side exceeding the torque variation rate switching threshold value; and executing, with the controller, a limitation suppression variation rate setting process in which the low torque side limitation variation rate is set to be larger than the high torque side limitation variation rate until the target driving torque reaches the torque variation rate switching threshold value.

* * * * *